US012571712B2

(12) United States Patent (10) Patent No.: US 12,571,712 B2
Jang et al. (45) Date of Patent: Mar. 10, 2026

(54) ULTRASENSITIVE SPECTROMETER

(71) Applicant: KOREA ADVANCED INSTITUTE OF SCIENCE AND TECHNOLOGY, Daejeon (KR)

(72) Inventors: Mooseok Jang, Daejeon (KR); Gookho Song, Daejeon (KR); Chunghyeong Lee, Daejeon (KR); Dong Gu Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 183 days.

(21) Appl. No.: 18/598,372

(22) Filed: Mar. 7, 2024

(65) Prior Publication Data

US 2024/0377304 A1 Nov. 14, 2024

(30) Foreign Application Priority Data

May 9, 2023 (KR) ........................ 10-2023-0059986

(51) Int. Cl.
 *G01N 15/0205* (2024.01)
 *G01N 15/00* (2024.01)
(52) U.S. Cl.
 CPC . *G01N 15/0211* (2013.01); *G01N 2015/0038* (2013.01)
(58) Field of Classification Search
 CPC ....... G01N 15/0211; G01N 2015/0038; G01N 21/255; G01N 21/314; G01J 3/0205; G01J 3/14; G01J 3/18; G01J 3/2823; G01J 3/4412
 USPC ........................................................ 356/326
 See application file for complete search history.

(56) References Cited

U.S. PATENT DOCUMENTS

| | | | |
|---|---|---|---|
| 10,161,797 B2 | 12/2018 | Shaltout et al. |
| 10,254,164 B2 | 4/2019 | Zollars et al. |
| 10,514,296 B2 | 12/2019 | Han et al. |
| 11,092,486 B2 | 8/2021 | Faraji-Dana et al. |
| 11,187,582 B2 | 11/2021 | Faraji-Dana et al. |
| 11,194,082 B2 | 12/2021 | Zhu et al. |

(Continued)

FOREIGN PATENT DOCUMENTS

| | | |
|---|---|---|
| CN | 107907483 A | 4/2018 |
| CN | 109341858 A | 2/2019 |

(Continued)

OTHER PUBLICATIONS

Korean Office Action dated Feb. 3, 2025 in Application No. 10-2023-0059986.

*Primary Examiner* — Md M Rahman
(74) *Attorney, Agent, or Firm* — Sughrue Mion, PLLC

(57) ABSTRACT

Provided is an ultrasensitive spectrometer. The ultrasensitive spectrometer includes a scattering medium, a light-receiving sensor disposed at a rear end of the scattering medium, a storage unit storing previously predicted speckle pattern information according to wavelengths with respect to the scattering medium, and a signal processing unit configured to process a sensing signal generated by the light-receiving sensor. The scattering medium scatters incident analyzing light to form a random speckle pattern, and the light-receiving sensor senses the speckle pattern formed by the scattering medium. The signal processing unit restores spectrum information of the analyzing light from sensing information sensed of the speckle pattern formed by the scattering medium.

18 Claims, 33 Drawing Sheets

(56)     References Cited

U.S. PATENT DOCUMENTS

| | | | |
|---|---|---|---|
| 11,239,276 | B2 | 2/2022 | Roberts et al. |
| 2015/0002844 | A1 | 1/2015 | Park et al. |
| 2020/0025610 | A1 | 1/2020 | Chandrasekhar et al. |
| 2020/0124866 | A1 | 4/2020 | Camayd-Munoz et al. |

FOREIGN PATENT DOCUMENTS

| | | | |
|---|---|---|---|
| CN | 110274877 | A | 9/2019 |
| KR | 10-1531102 | B1 | 6/2015 |
| KR | 10-2017-0015109 | A | 2/2017 |
| KR | 10-2021-0011472 | A | 2/2021 |

MEDIUM 1
- 100ml PDMS + 1.5g ZnO
- 3ml deposit $L = 131 \; \mu m, l_s = 46.8 \; \mu m \; [L/l_s \sim 2.8]$

[nm]

MEDIUM 2
- 100ml PDMS + 12g ZnO
- 0.75ml deposit $L = 39 \ \mu m, l_s = 4.9 \mu m \ [L/l_s \sim 7.9]$

MEASUREMENT MODEL

Intensity I
(Measured)

Response matrix T
(Pre-calibration)

Input
spectrum x

RESTORATION THROUGH INVERSE OPERATION
(USE COMPRESSION SENSING ALGORITHM)

ULTRASENSITIVE SPECTROMETER

CROSS-REFERENCE TO RELATED APPLICATION

This application is based on and claims priority under 35 U.S.C. § 119 to Korean Patent Application No. 10-2023-0059986, filed on May 9, 2023, in the Korean Intellectual Property Office, the disclosure of which is incorporated by reference herein in its entirety.

BACKGROUND

1. Field

The disclosure relates to an ultrasensitive spectrometer.

This research was supported by the Samsung Future Technology Development Project (Task Number: SRFC-IT2002-03).

2. Description of the Related Art

Spectrometers are a type of optical instruments that decompose light absorbed or emitted by a target material according to wavelengths and measure the spectral distribution thereof. Spectrometers use optical elements such as a diffraction grating, a prism, an interferometer, and an optical filter to decompose light according to wavelengths. This spectrometer requires a free distance between the optical element and a light-receiving sensor that senses spectra, and as a required resolution is great, a size of the spectrometer increases.

SUMMARY

Provided is an ultrasensitive spectrometer capable of realizing ultra-small form factors.

Additional aspects will be set forth in part in the description which follows and, in part, will be apparent from the description, or may be learned by practice of the presented embodiments of the disclosure.

According to an aspect of the disclosure, an ultrasensitive spectrometer includes a scattering medium configured to scatter incident analyzing light to form a random speckle pattern that sensitively changes according to wavelength variations, a light-receiving sensor disposed at a rear end of the scattering medium and configured to sense the speckle pattern formed by the scattering medium, a storage unit storing previously predicted speckle pattern information according to wavelengths with respect to the scattering medium, and a signal processing unit configured to process a sensing signal generated by the light-receiving sensor to restore spectrum information of the analyzing light from sensing information of the speckle pattern formed by the scattering medium.

At least one condition among scattering characteristics of the scattering medium and a separation distance between the scattering medium and the light-receiving sensor may be determined such that a speckle size of at least some of speckles of the speckle pattern formed on a sensing surface of the light-receiving sensor may be greater than a pixel size of the light-receiving sensor.

The at least one condition may be determined such that an average speckle size of the speckle pattern may be greater than the pixel size of the light-receiving sensor.

The signal processing unit may be further configured to restore the spectrum information by applying a compressive sensing algorithm to the sensing information of the speckle pattern.

The signal processing unit may be further configured to restore the spectrum information of the analyzing light through an inverse operation process that sensing information of an overlapped speckle pattern represents as a matrix operation a compressive sensing response matrix obtained using the previously predicted speckle pattern information stored in the storage unit and an input spectrum.

The scattering medium may include a transparent medium and nanoparticles disorderly dispersed in the transparent medium.

The nanoparticles may include a plurality of nanoparticles having different sizes, and a size range of the nanoparticles may be determined to obtain spectral characteristics in a set spectral range.

The transparent medium may be transparent to visible light.

The transparent medium may include polydimethylsiloxane (PDMS), and the nanoparticles may include ZnO.

The scattering medium may be single layered or may be formed by stacking a plurality of scattering medium layers.

A thickness and a scattering coefficient of the scattering medium may be limited to obtain a set spectral resolution.

The thickness and the scattering coefficient of the scattering medium may be limited to obtain a spectral resolution of 0.1 nm or less.

The scattering medium may comprise a stacked structure of a plurality of metasurfaces that are spaced apart from each other and each have an array of meta-atoms.

At least one of the plurality of metasurfaces may be a random metasurface.

The random metasurface may include meta-atoms arranged in a disordered size distribution.

The meta-atoms of the random metasurface may be formed at an identical height and sizes of the meta-atoms may be irregular.

The meta-atoms of the random metasurface may be regularly positioned.

The meta-atoms of the random metasurface may be regularly positioned and may have irregular sizes.

A separation distance between the plurality of metasurfaces may be limited to obtain a spectral resolution of 0.1 nm or less.

At least one of a number of the plurality of metasurfaces and a separation distance between metasurfaces may be determined such that speckle sizes of at least some of speckles of the speckle pattern may be greater than a pixel size of the light-receiving sensor.

A degree of disorder of the plurality of metasurfaces may be constrained such that an average speckle size of the speckle pattern may be greater than the pixel size of the light-receiving sensor.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 12A to 12H are plan views illustrating exemplary shapes of meta-atoms applicable to a metasurface;

DETAILED DESCRIPTION

Figure 1:
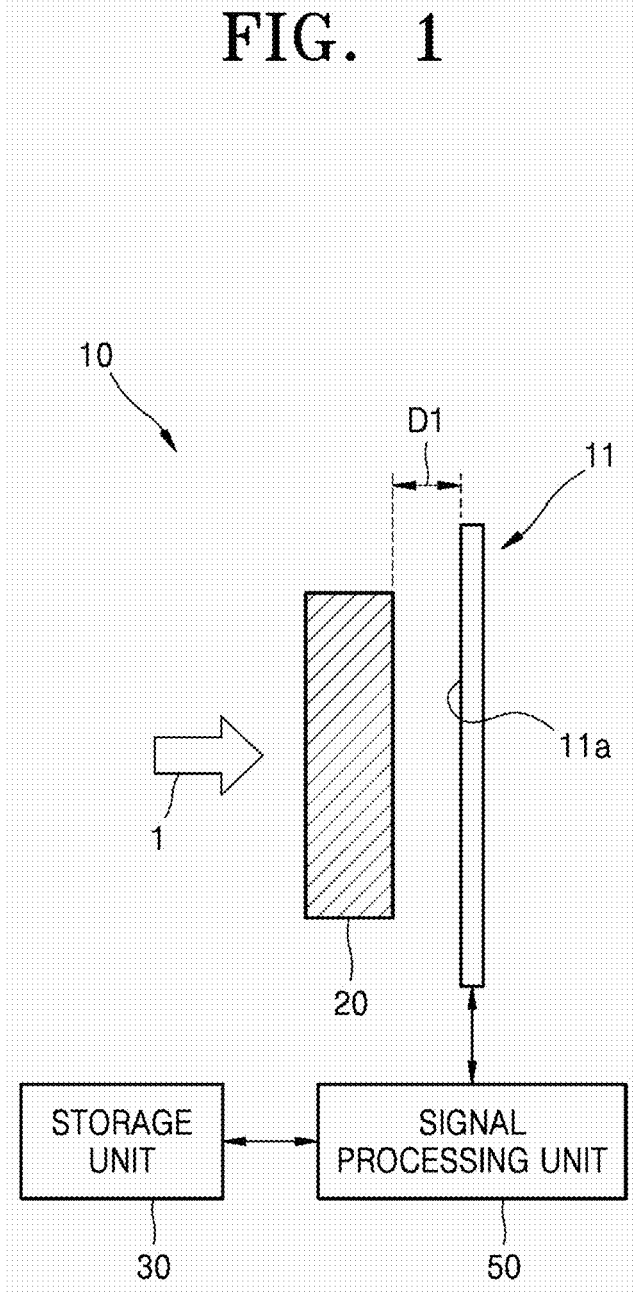
FIGS. 1 and 2 are diagrams schematically illustrating an ultrasensitive spectrometer according to embodiments.

Reference will now be made in detail to embodiments, examples of which are illustrated in the accompanying drawings. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described with reference to the accompanying drawings. In the drawings, like reference numerals refer to like elements, and the sizes of elements may be exaggerated for clarity of illustration. The embodiments described herein are for illustrative purposes only, and various modifications may be made therein.

In the following description, when an element is referred to as being "above" or "on" another element, it may be directly on an upper, lower, left, or right side of the other element while making contact with the other element or may be above an upper, lower, left, or right side of the other element without making contact with the other element. The terms of a singular form may include plural forms unless otherwise mentioned. It will be further understood that the terms "comprises" and/or "comprising" used herein specify the presence of stated features or elements, but do not preclude the presence or addition of one or more other features or elements.

An element referred to with the definite article or a demonstrative determiner may be construed as the element or the elements even though it has a singular form. Operations of a method may be performed in an appropriate order unless explicitly described in terms of order or described to the contrary, and are not limited to the stated order thereof.

In the disclosure, terms such as "unit" or "module" may be used to denote a unit that has at least one function or operation and is implemented with hardware, software, or a combination of hardware and software.

Furthermore, line connections or connection members between elements depicted in the drawings represent functional connections and/or physical or circuit connections by way of example, and in actual applications, they may be replaced or embodied with various additional functional connections, physical connections, or circuit connections.

Examples or exemplary terms are just used herein to describe technical ideas and should not be considered for purposes of limitation unless defined by the claims.

Embodiments provide an ultrasensitive spectrometer in which a scattering medium forms a speckle pattern on a sensing surface of a light-receiving sensor by scattering light to be analyzed, and spectral information of the light to be analyzed is restored by processing a sensing signal of the light-receiving sensor. In this case, scattering characteristics of the scattering medium may be limited such that the sizes of at least some of speckles of the speckle pattern formed on the sensing surface of the light-receiving sensor may be greater than the pixel size of the light-receiving sensor. For example, the scattering characteristics of the scattering medium may be limited such that the average speckle size of the speckle pattern may be greater than the pixel size of the light-receiving sensor. As is well known, the speckle pattern refers to a pattern in which bright regions (speckle grains) are distributed in random positions, brightness, and sizes on a dark background. The term "speckle size" may refer to the average size of bright regions (speckle grains) of a speckle pattern. For example, a speckle size may be calculated by taking the autocorrelation of a speckle pattern image and calculating the full width half maximum (FWHM) of a peak.

The average speckle size of a speckle pattern may be the average size of bright regions of an overall speckle pattern.

Figure 2:
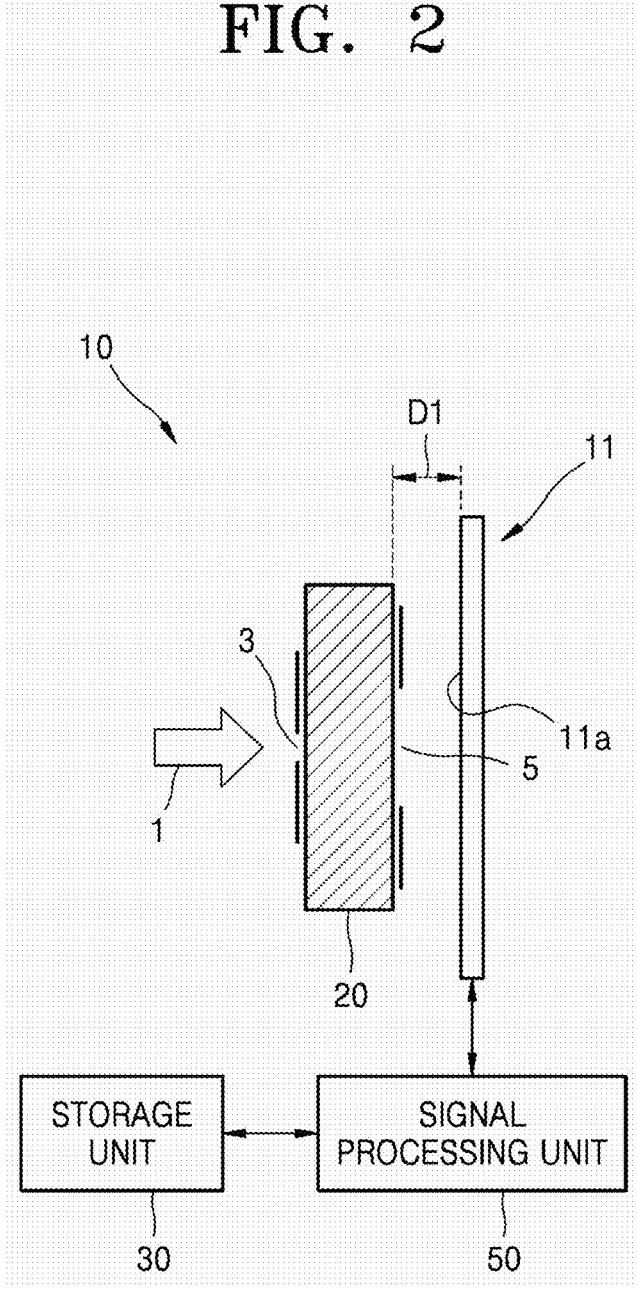
Figure 3:
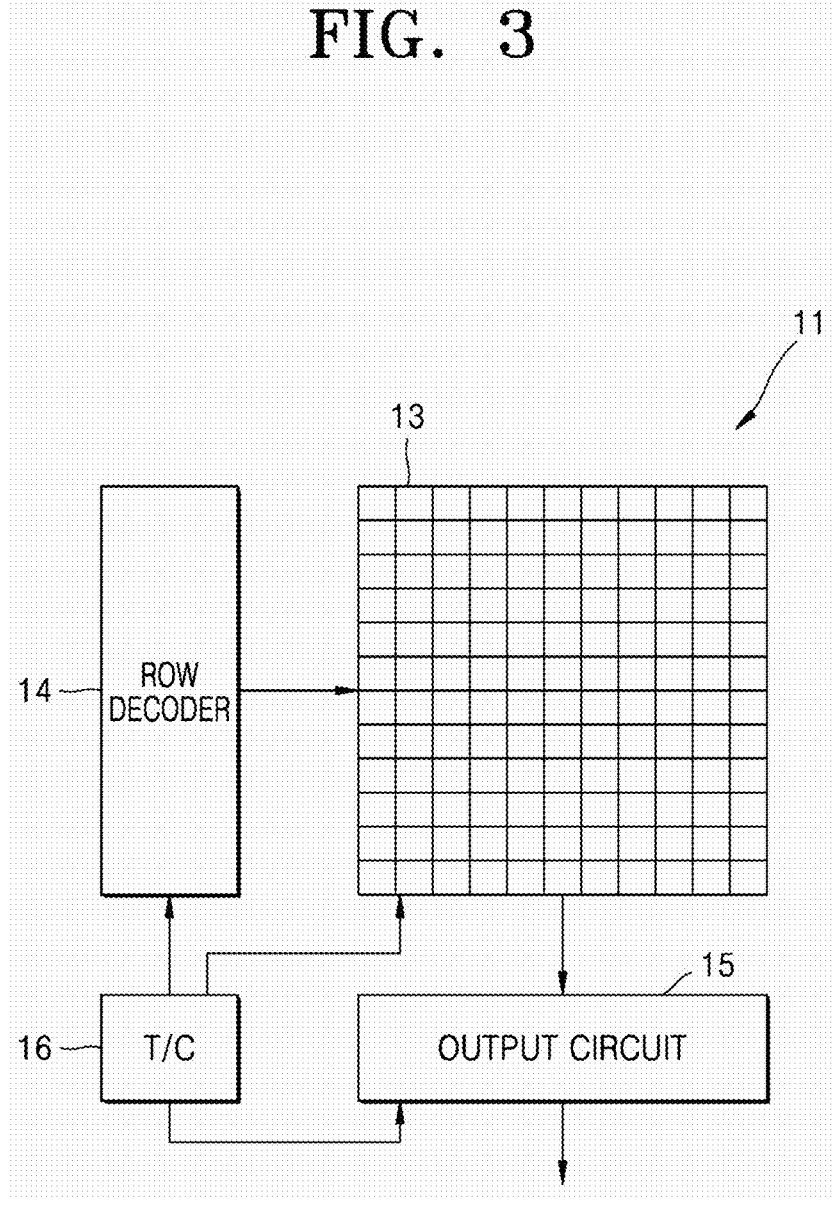
FIG. 3 is a block diagram schematically illustrating a configuration of a light-receiving sensor of FIGS. 1 and 2.

FIGS. 1 and 2 are diagrams schematically illustrating an ultrasensitive spectrometer 10 according to embodiments. FIG. 2 illustrates an example in which the ultrasensitive spectrometer 10 further includes first and second openings 3 and 5 respectively at front and rear ends of a scattering medium 20 to limit a region through which light is incident on the scattering medium 20 and a region through which the light passing through the scattering medium 20 is output. FIG. 3 is a block diagram schematically illustrating a configuration of a light-receiving sensor 11 of FIGS. 1 and 2.

Referring to FIGS. 1 and 2, the ultrasensitive spectrometer 10 includes the light-receiving sensor 11, the scattering medium 20 disposed in front of the light-receiving sensor 11, a storage unit 30 storing information on previously predicted speckle patterns of the scattering medium 20, and a signal processing unit 50 configured to restore spectrum information of light 1 to be analyzed (analyzing light 1) by processing a sensing signal of the light-receiving sensor 11. The scattering medium 20 scatters the incident analyzing light 1 to form a random speckle pattern that sensitively changes according to variations in wavelength. The light-receiving sensor 11 senses a speckle pattern formed by the scattering medium 20. As exemplarily shown in FIG. 2, the ultrasensitive spectrometer 10 according to an embodiment may further include the first opening 3 in a side through which the analyzing light 1 enters the scattering medium 20 and the second opening 5 at a side through which the analyzing light 1 is output after passing through the scattering medium 20. The first opening 3 may limit a region through the analyzing light 1 is incident on the scattering medium 20. Although FIG. 2 illustrates that the first opening 3 and the second opening 5 are apart from the scattering medium 20, embodiments are not limited thereto. For example, at least one of the first opening 3 and the second opening 5 may be disposed on the scattering medium 20 without a gap therebetween.

In addition, the analyzing light 1 may have a wavelength within a certain range. For example, the analyzing light 1 may have a wavelength within a range of about 400 nm to about 700 nm. The analyzing light 1 may have a wavelength within another range. The wavelength range of the analyzing light 1 may vary depending on an object to be analyzed. According to embodiments, specifications of the ultrasensitive spectrometer 10 may be determined according to a wavelength band to be analyzed. The scattering medium 20 may be set depending on a wavelength band to be analyzed, and specifications of the ultrasensitive spectrometer 10 may be accordingly be determined. The ultrasensitive spectrometer 10 according to an embodiment may further include a filter member (not shown) at the front end of the scattering medium 20 to block light in wavelength ranges outside a wavelength band to be analyzed, thereby reducing noise caused by light having wavelengths outside the wavelength band to be analyzed.

Referring to FIG. 3, the light-receiving sensor 11 may be pixelated and may include a pixel array 13 in which a plurality of pixels are two-dimensionally arranged on a sensing surface 11a of the light-receiving sensor 11. The light-receiving sensor 11 may further include a timing controller 16, a row decoder 14, and an output circuit 15.

A speckle pattern may be formed on the sensing surface 11a of the light-receiving sensor 11 by light scattered by the scattering medium 20. The pixels of the light-receiving sensor 11 may each have a size less than the sizes of at least some of speckles of the speckle pattern. The pixels may be micro-sized or sub-micro-sized. However, embodiments are not limited thereto.

As described later, in the ultrasensitive spectrometer 10 according to an embodiment, the sizes of at least some of speckles of a speckle pattern formed on the sensing surface 11a of the light-receiving sensor 11 may be limited to be greater than the pixel size of the light-receiving sensor 11. In addition, the average speckle size of the speckle pattern may be limited to be greater than the pixel size of the light-receiving sensor 11. In addition, the ultrasensitive spectrometer 10 according to an embodiment may be set to satisfy the Nyquist condition such that a speckle pattern with a speckle size twice or more than the pixel size of the light-receiving sensor 11 may be formed on the sensing surface 11a of the light-receiving sensor 11. The scattering characteristics of the scattering medium 20 and the separation distance between the scattering medium 20 and the sensing surface 11a of the light-receiving sensor 11 may be determined to satisfy the conditions described above.

The row decoder 14 may select one or two or more of rows of the pixel array 13 of the light-receiving sensor 11 in response to a row address signal that is output from the timing controller 16. The output circuit 15 may output light-sensing signals in units of columns from a plurality of pixels arranged in the selected row. To this end, the output circuit 15 may include a column decoder, an analog-to-digital converter (ADC), and the like. For example, the output circuit 15 may include a plurality of ADCs respectively arranged for columns between the column decoder and the light-receiving sensor 11, or may include one ADC disposed at an output terminal of the column decoder. The timing controller 16, the row decoder 14, and the output circuit 15 may be implemented as a single chip or as separate chips. The signal processing unit 50 configured to process sensing signals output through the output circuit 15 may be implemented as a single chip together with the timing controller 16, the row decoder 14, and the output circuit 15.

Referring back to FIGS. 1 and 2, the scattering medium 20 may scatter incident analyzing light 1, thereby forming a random speckle pattern that sensitively changes according to variations in wavelength. A speckle pattern formed by the scattering medium 20 may be received on the sensing surface 11a of the light-receiving sensor 11. The scattering medium 20 may form a separation distance D1 from the sensing surface 11a of the light-receiving sensor 11. Scattering characteristics determined by the scattering coefficient and the thickness of the scattering medium 20, and/or the separation distance D1 from the sensing surface 11a or the like may be determined such that the sizes of at least some of speckles of a speckle pattern formed on the sensing surface 11a of the light-receiving sensor 11 may be greater than the pixel size of the light-receiving sensor 11. In addition, the scattering characteristics determined by the scattering coefficient and the thickness of the scattering medium 20 and/or the separation distance D1 from the sensing surface 11a or the like may be determined such that the average speckle size of a speckle pattern formed on the sensing surface 11a of the light-receiving sensor 11 may be greater than the pixel size of the light-receiving sensor 11.

Figure 4:
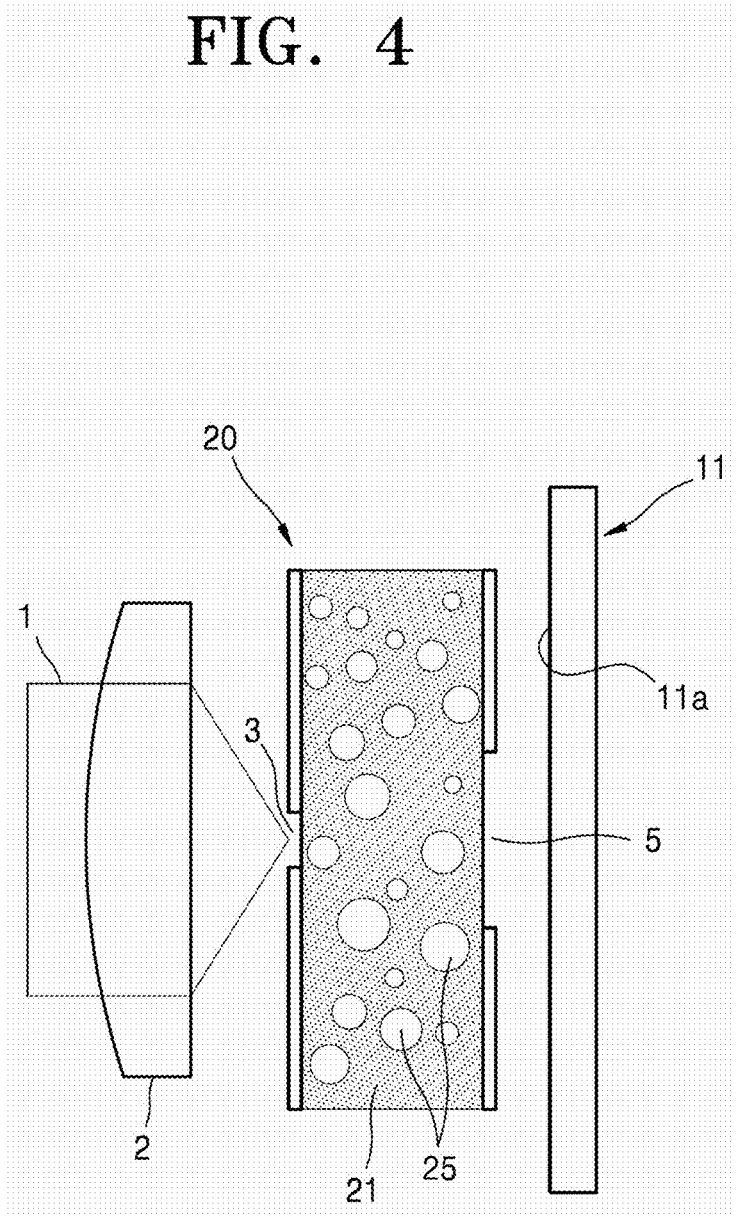
FIG. 4 is a diagram exemplarily illustrating an arrangement of a scattering medium and the light-receiving sensor in the ultrasensitive spectrometer, according to an embodiment.
Figure 8:
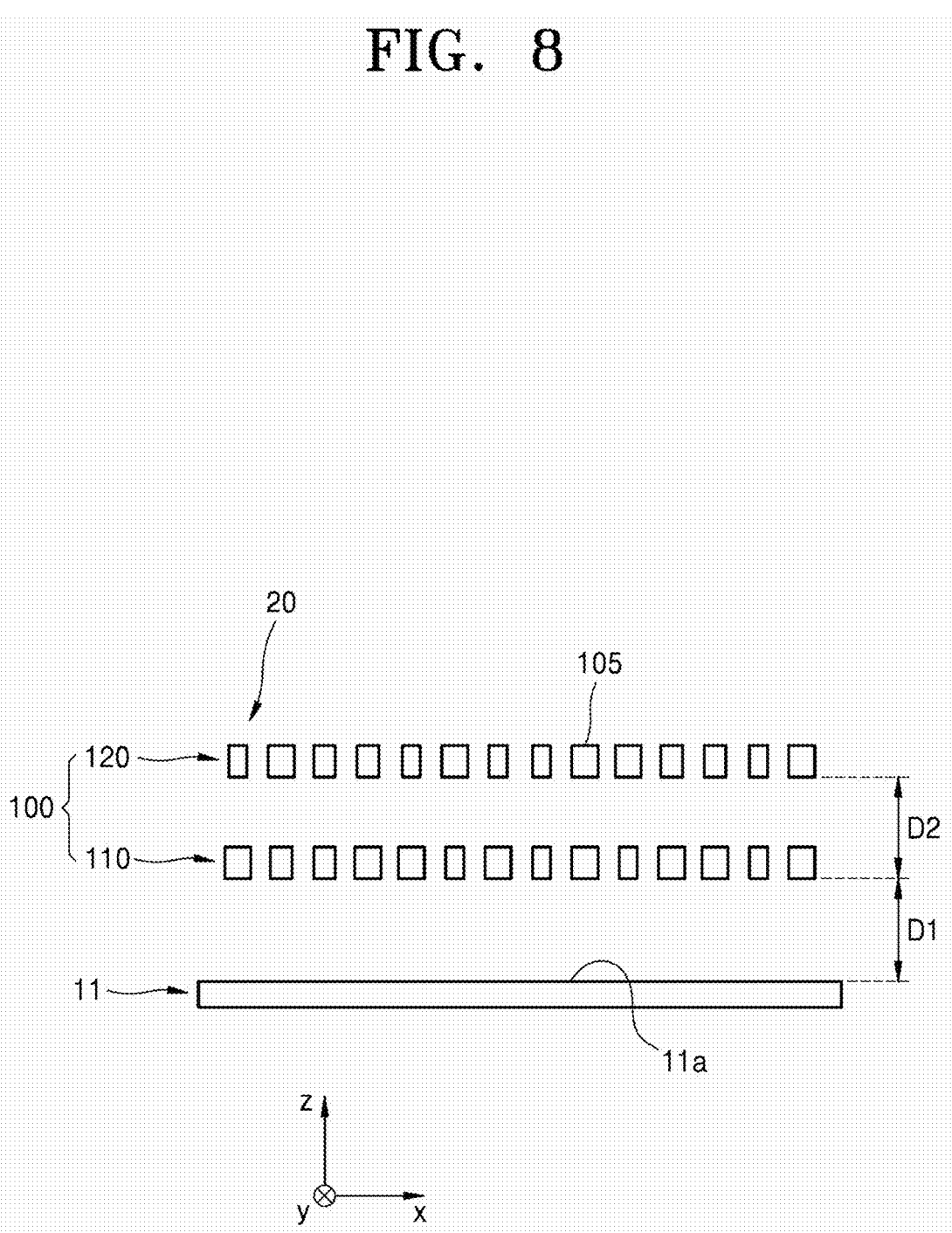
FIGS. 8 and 9 exemplarily illustrate an arrangement of the scattering medium and the light-receiving sensor in the ultrasensitive spectrometer according to an embodiment, showing an example in which the scattering medium is composed of a stacked structure of a plurality of metasurfaces having an array of meta-atoms.
Figure 9:
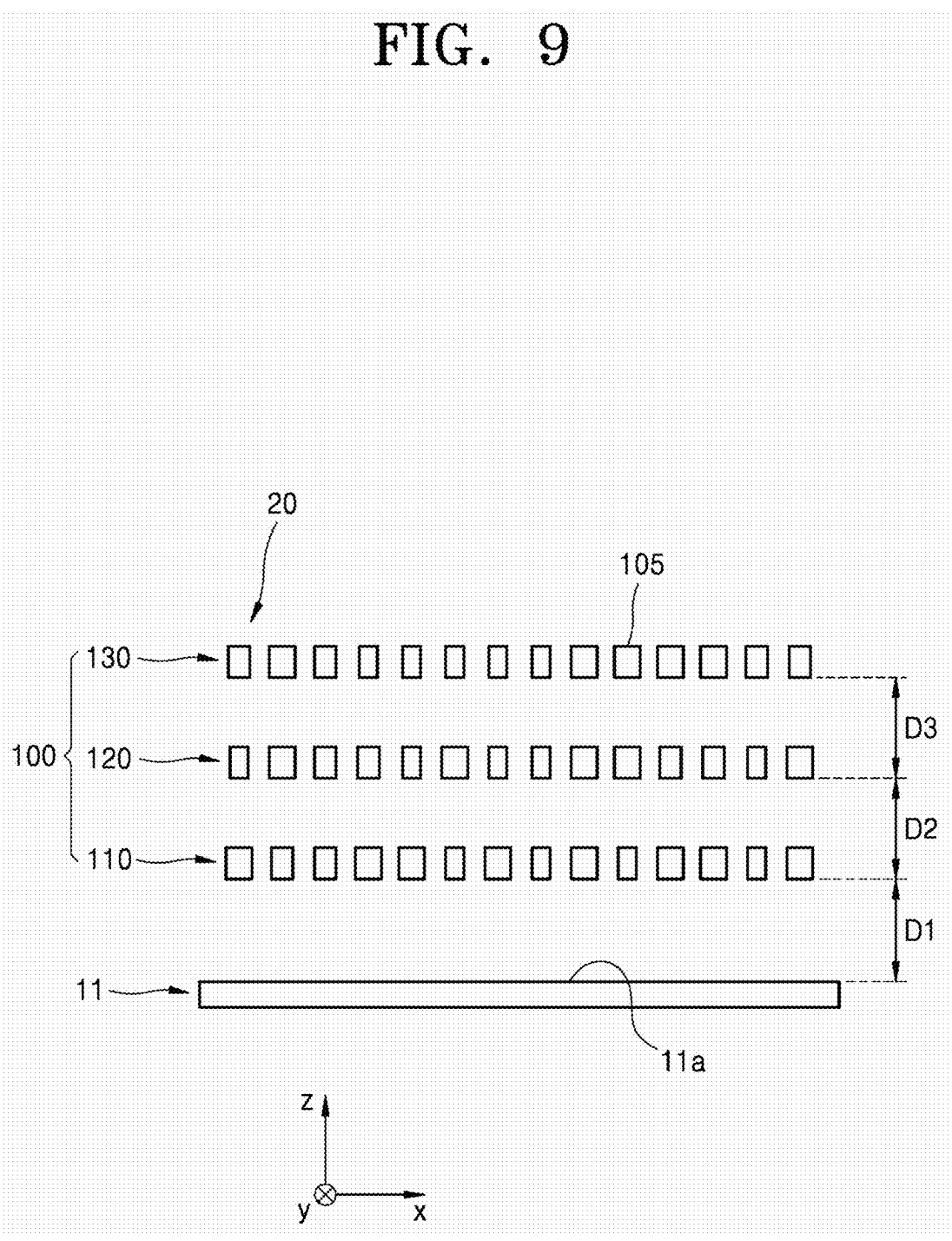

As illustrated in FIG. 4, for example, the scattering medium 20 may be formed by disorderly dispersing nanoparticles 25 (scatterer) in a transparent medium 21, and the thickness of the scattering medium 20 may correspond to the thickness of the transparent medium 21. In another example, the scattering medium 20 may be formed by a stacked structure of a plurality of metasurfaces 100 having an array of meta-atoms 105 as illustrated in FIGS. 8 and 9. When the scattering medium 20 is formed by a stacked structure of a plurality of metasurfaces 100, the metasurfaces 100 may be spaced apart from each other, and the thickness of the scattering medium 20 may approximately correspond to the sum of the distances between the metasurfaces 100. For example, when the scattering medium 20 includes two metasurfaces, the thickness of the scattering medium 20 may approximately correspond to the distance between the two metasurfaces.

The scattering medium 20 may be prepared to obtain a set spectral resolution. A spectral resolution of the ultrasensitive spectrometer 10 according to an embodiment may be determined by the thickness and the scattering coefficient of the scattering medium 20. The scattering coefficient and the thickness of the scattering medium 20 may be limited to obtain a spectral resolution of about 0.1 nm or less, for example, about 0.001 nm.

The storage unit 30 may store characteristic information of the scattering medium 20. The characteristic information of the scattering medium 20 may include previous information of speckle patterns formed according to wavelengths by the scattering medium 20. Wavelength-based characteristic information varying depending on the scattering coefficient and the thickness of the scattering medium 20 may be converted into lookup table data, and the lookup table data may be stored in the storage unit 30.

The signal processing unit 50 may process a sensing signal of the light-receiving sensor 11 and restore spectral information of analyzing light 1 from a speckle pattern formed by the scattering medium 20 and the characteristic information of the scattering medium 20 stored in the storage unit 30 such as previous information of speckle patterns. The signal processing unit 50 may be prepared to restore, using a compressive sensing algorithm technique, spectral information of the analyzing light 1. That is, when the scattering medium 20 scatters the analyzing light 1, different speckle patterns may be formed according to wavelengths, and thus the speckle patterns may be overlapped on the sensing surface 11a of the light-receiving sensor 11. Therefore, information sensed by the light-receiving sensor 11 may be about an overlapped speckle pattern. Therefore, spectral information of the analyzing light 1 may be restored by applying a compressive sensing algorithm to sensing information of overlapped speckle patterns using previously predicted speckle pattern information stored in the storage unit 30. For example, as in a measurement model exemplarily illustrated in FIG. 20 described later, spectral information of analyzing light 1 may be restored through performing an inverse operation process that sensing information of overlapped speckle patterns represents as a matrix operation of a compressive sensing response matrix obtained using previously predicted speckle pattern information stored in the storage unit and an input spectrum. The compressive sensing response matrix may be previously calibrated (pre-calibration) to increase the accuracy of spectrum restoration.

FIG. 4 exemplarily illustrates an arrangement of the scattering medium 20 and the light-receiving sensor 11 in the ultrasensitive spectrometer 10 according to an embodiment. FIG. 4 shows an example in which the scattering medium 20 includes the transparent medium 21 and the nanoparticles 25 disorderly dispersed in the transparent medium 21. As illustrated in FIG. 4, the first opening 3 and the second opening 5 may be respectively provided in the front and rear ends of the scattering medium 20, and the analyzing light 1 may be condensed by, for example, a condensing lens 2 and may be incident on the scattering medium 20 through the first opening 3. However, embodiments are not limited thereto, and various modifications may be made therein.

Referring to FIG. 4, conditions such as a size (diameter), a material, and a dispersion density of the nanoparticles 25 dispersed in the transparent medium 21, and a thickness of the scattering medium 20 may be limited to obtain a set spectral resolution.

When the nanoparticles 25 are disorderly dispersed in the scattering medium 20, a wavelength sensitivity, that is, a spectral resolution $\Delta\lambda$ may be approximately proportional to a mean free transport distance $I_t$ and may be inversely proportional to a square of a thickness L of the scattering medium 20 as expressed by Equation 1 below.

$$\Delta\lambda \sim 2 l_t \lambda_c^2 / L^2 \qquad \text{[Equation 1]}$$

In Equation 1, $\lambda_c$ refers to a center scattering wavelength of the scattering medium 20. The mean free transport distance $I_t$ of the scattering medium 20 corresponds to a scattering coefficient of the scattering medium 20.

For example, when the scattering medium 20 is formed to be $I_t$=30 μm and L=1 mm, the spectral resolution $\Delta\lambda$ is about 0.015 nm at a center scattering wavelength $\Delta_c$ of about 500 nm, and is about 0.06 nm at a center scattering wavelength $\lambda_c$ of about 1 μm. In this manner, the scattering medium 20 may be formed to obtain a spectral resolution of about 0.1 nm or less when light to be analyzed is in the visible light region, the infrared region, or a longer wavelength band.

According to embodiments, the transparent medium 21 of the scattering medium 20 may include various materials in which the nanoparticles 25 are dispersible. For example, to transmit visible light, the transparent medium 21 may include polydimethylsiloxane (PDMS), and the nanoparticles 25 may include ZnO nanoparticles. However, embodiments are not limited thereto.

For example, the scattering medium 20 may be formed by stacking two or more thin scattering medium layers to achieve a set wavelength sensitivity, that is, a spectral resolution of about 0.1 nm or less. For example, a thin scattering medium layer in which ZnO nanoparticles are dispersed in a PDMS transparent medium may be formed to a thickness of about several tens to several hundreds of micrometers (μm), and a plurality of such thin scattering medium layers may be disposed to overlap each other, thereby forming the scattering medium 20 having a set wavelength sensitivity.

In addition, the nanoparticles 25 dispersed in the scattering medium 20 may have two or more sizes. As is well known, the spectrum of scattered light varies according to the sizes of the nanoparticles 25. The size range of the nanoparticles 25 may be determined to obtain spectral characteristics in a set spectral range. FIG. 4 shows an example in which the nanoparticles 25 have approximately three sizes. However, embodiments are not limited thereto, and the nanoparticles 25 may have more various sizes.

In addition, although FIG. 4 illustrates that the scattering medium 20 has a single layer with an intended thickness, this is merely an example for convenience and does not limit the scattering medium 20 to having only a single layer. For example, the scattering coefficient $I_s$ and thickness L of scattering medium 20 may be determined to obtain an L/$I_s$ value guaranteeing a set spectral resolution. For example, as described above, the scattering medium 20 may be prepared by stacking two or more thin scattering medium layers to obtain an $L/I_s$ value guaranteeing a set spectral resolution. In this case, multiple stacked thin scattering medium layers correspond to a stack of transparent mediums each having nanoparticles dispersed therein, and at least one boundary between the stacked thin scattering medium layers is also transparent, such that the structure in which the multiple thin scattering medium layers are stacked may be considered as a single-layered scattering medium 20 in which nanoparticles 25 are dispersed in a transparent medium 21. In another example, the scattering medium 20 may be formed as a single layer having a scattering coefficient $I_s$ and a thickness L of which $L/I_s$ value guarantees a set spectral resolution.

To obtain the scattering medium 20 including the transparent medium 21 and the nanoparticles 25 dispersed in the transparent medium 21, a thin scattering medium layer in which ZnO nanoparticles are dispersed in a PDMS medium may be formed, for example, as follows. PDMS curable resin may be composed of a main material and a curing agent, and the main material and the curing agent may be mixed at a predetermined ratio, for example, about 10:1. To fabricate the thin scattering medium layer, first, a small amount of ZnO nanoparticle powder may be mixed into PDMS solution. ZnO nanoparticles may have a size of about 100 nm or less, and may have two or more sizes. For example, a mixture solution may be prepared by mixing about 1.5 g of ZnO nanoparticle powder with about 100 ml of the PDMS solution. The mixture solution may be spin coated with a predetermined amount on a plate of the mixture solution and may be baked to form a thin scattering medium layer in which ZnO is dispersed in a PDMS medium. The baking may be performed at a relatively low temperature, for example, at about 100 degrees Celsius or less, or about 80 degrees Celsius or less. However, embodiments are not limited thereto. The baking may be performed at a temperature of 100 degrees Celsius or more. The scattering coefficient and the thickness of the thin scattering medium layer may vary depending on conditions such as the concentration of the mixture solution, the amount of the mixture solution used for one spin coating, and the rotational speed of the spin coating. For example, about 3 ml of the mixture solution in which about 1.5 g of ZnO nanoparticle powder is mixed with about 100 ml of the PDMS solution may be poured onto a circular plate having a diameter of about 14 cm, and then spin coating may be performed at about 1000 RPM until the mixture solution is spread over the entire surface of the circular plate and baking may be performed at about 80 degrees Celsius for about 1 hour. In this manner, for example, a thin scattering medium layer having a thickness L of about 131 μm and a scattering coefficient $I_s$ of about 46.8 μm may be formed.

The scattering medium 20 in which the nanoparticles 25 are dispersed in the transparent medium 21 may be formed by stacking a plurality of thin scattering medium layers each formed as described above.

Figure 5:
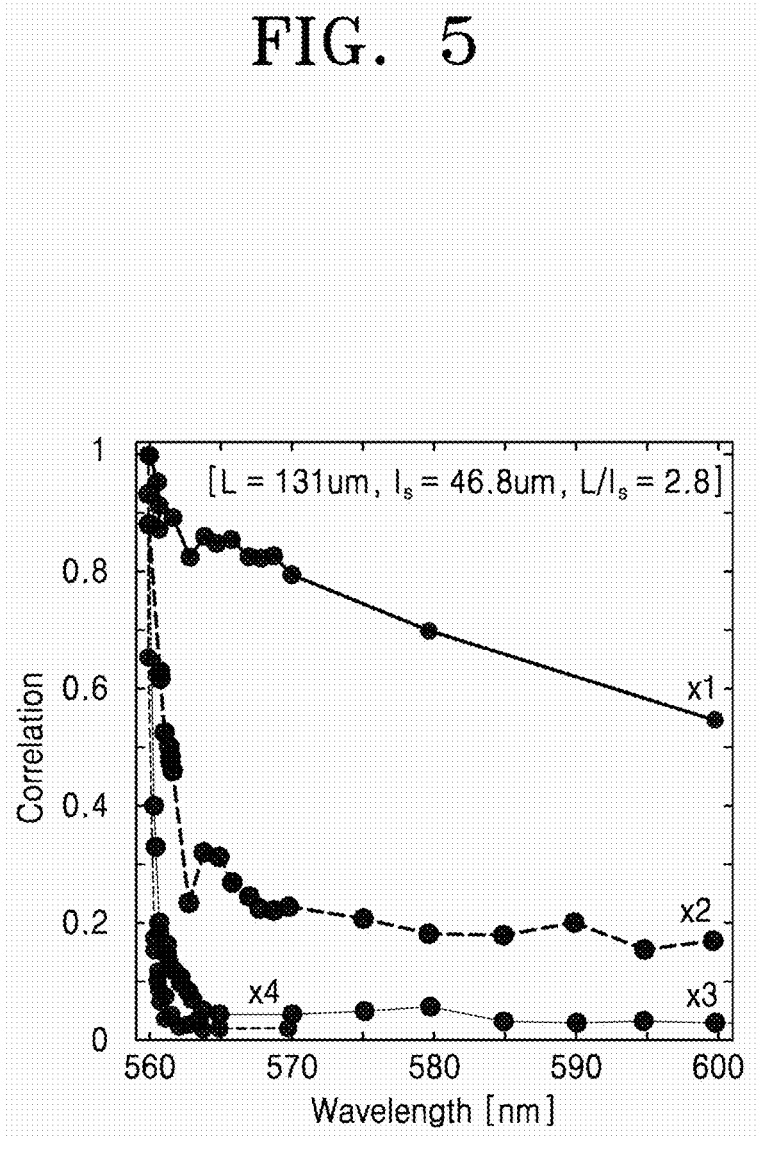
FIGS. 5 and 6 are graphs illustrating wavelength response characteristics of the scattering medium according to the number of stacked thin scattering medium layers.
Figure 6:
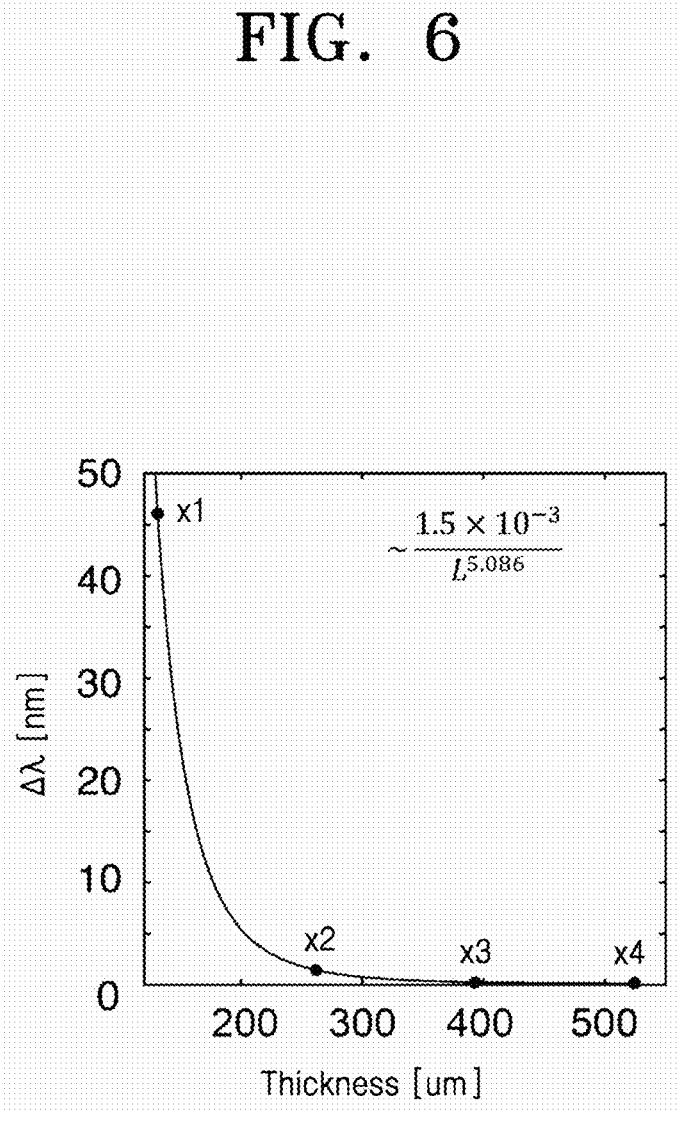

FIGS. 5 and 6 are graphs illustrating wavelength response characteristics of the scattering medium 20 according to the number of stacked thin scattering medium layers. FIGS. 5 and 6 illustrate wavelength response characteristics according to the number of stacked thin scattering medium layers when forming a thin scattering medium layer with a thickness L of about 131 μm, a scattering coefficient $I_s$ of about 46.8 μm, and $L/I_s$=2.8. The scattering coefficient $I_s$ indicates that light entering the scattering medium 20 is scattered once when the light travels a distance of $I_s$ on average while passing through the scattering medium 20, and corresponds to the mean free transport distance $I_t$ described above. In FIG. 5, the horizontal axis refers to wavelength, and the vertical axis refers to correlation between a speckle pattern at each wavelength and a speckle pattern at a wavelength of 560 nm. Furthermore, in FIGS. 5 and 6, ×1 refers to an example in which the scattering medium 20 is composed of one thin scattering medium layer, and ×2, ×3, and ×4 respectively refer to examples in which the scattering medium 20 is composed of two, three, and four thin scattering medium layers, respectively.

Referring to FIG. 5, it could be understood that when the scattering medium 20 is composed of one thin scattering medium layer, a change in a speckle pattern depending on wavelength is not significant. On the other hand, it could be understood that when the scattering medium 20 is composed of two or more thin scattering medium layers, a change in a speckle pattern increases depending on wavelength. Therefore, as shown in FIG. 6, it could be understood that the spectral resolution Δλ improves as the thickness of the scattering medium 20 increases, and it could be understood that the change in spectral resolution Δλ occurs largely up to a certain thickness range, for example, a thickness range of about 200 μm to about 300 μm, and that the change in spectral resolution Δλ is not significant at a thickness beyond the certain thickness range. As shown in FIG. 6, the graph showing a relationship between the thickness L and the spectral resolution Δλ of the scattering medium 20 may be approximately fitted to $1.5 \times 10^{-3}/L^{5.086}$.

Figure 7A:
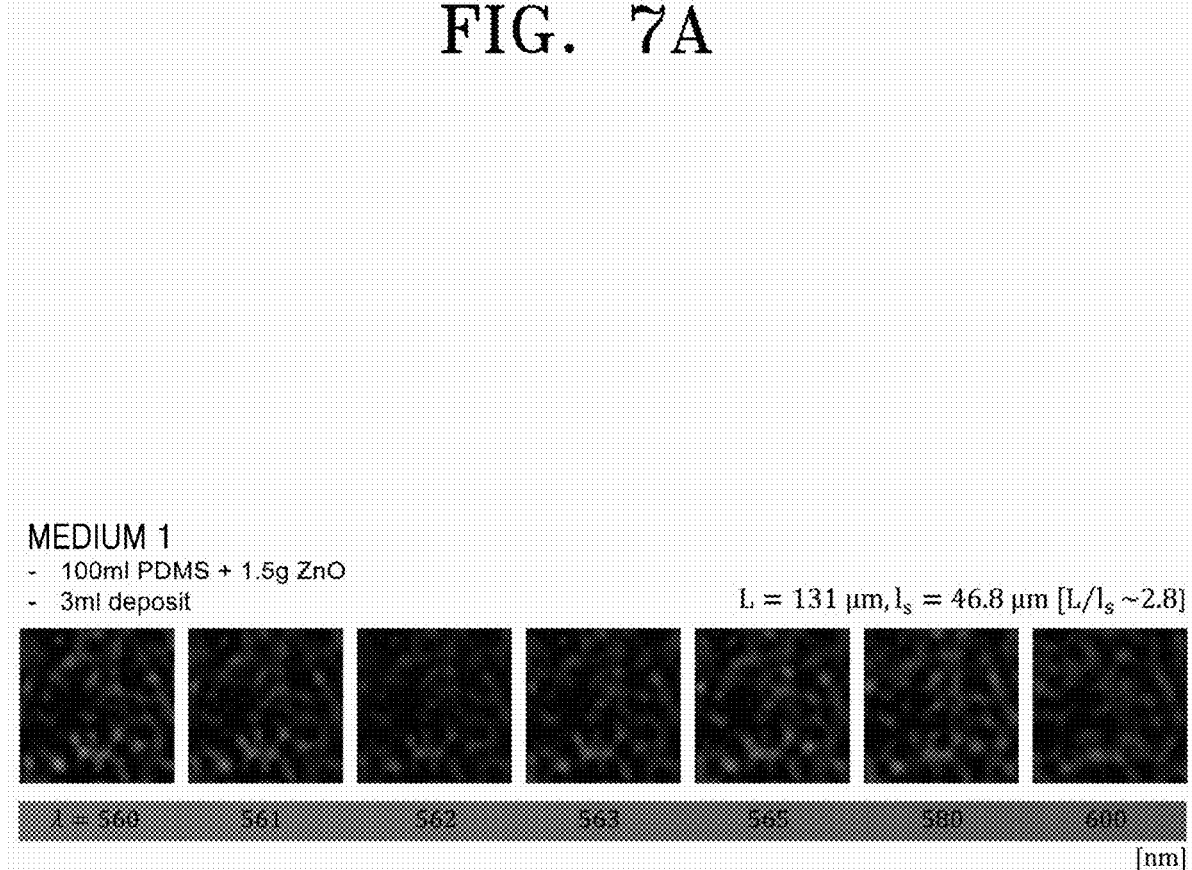
FIGS. 7A and 7B are diagrams illustrating speckle pattern variations according to wavelengths for a single thin scattering medium layer when it is manufactured so that the thickness and the scattering coefficient of the thin scattering medium layer are varied by adjusting the concentration and amount of a mixture solution in which ZnO nanoparticles are dispersed.
Figure 7B:
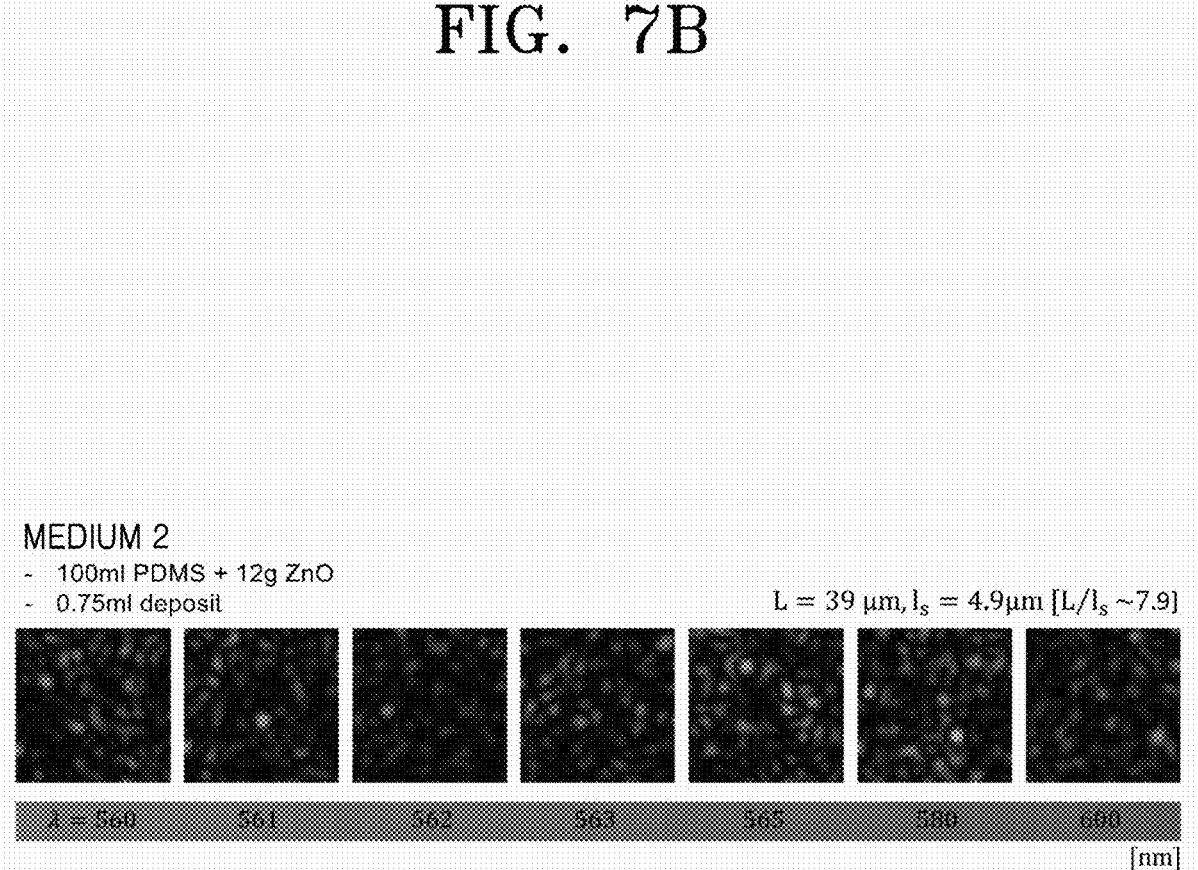

FIGS. 7A and 7B illustrate speckle pattern variations according to wavelength for a single thin scattering medium layer when it is manufactured so that the thickness and the scattering coefficient of the thin scattering medium layer are varied by adjusting the concentration and amount of a mixture solution in which ZnO nanoparticles are dispersed.

The thin scattering medium layer resulting in the speckle pattern variations illustrated in FIG. 7A is formed using 3 ml of a mixture solution in which about 100 ml of a PDMS solution is mixed with about 1.5 g of ZnO nanoparticle powder such that the thin scattering medium layer may have a thickness L of about 131 μm and a scattering coefficient $I_s$ of about 46.8 μm (that is, $L/I_s$=2.8).

The thin scattering medium layer resulting in the speckle pattern variations illustrated in FIG. 7B is formed using 0.75 ml of a mixture solution in which about 100 ml of a PDMS solution is mixed with about 12 g of ZnO nanoparticle powder such that the thin scattering medium layer may have a thickness L of about 39 μm and a scattering coefficient $I_s$ of about 4.9 μm (that is, $L/I_s$=7.9).

Comparing FIGS. 7A and 7B, it could be understood that even when the thin scattering medium layer is formed to reduce the thickness and the scattering coefficient, the speckle patterns may vary at wavelength interval of about 1 nm. This shows that a thin scattering medium layer manufactured by adjusting the thickness and scattering coefficient may be applied as the scattering medium 20.

Figure 10:
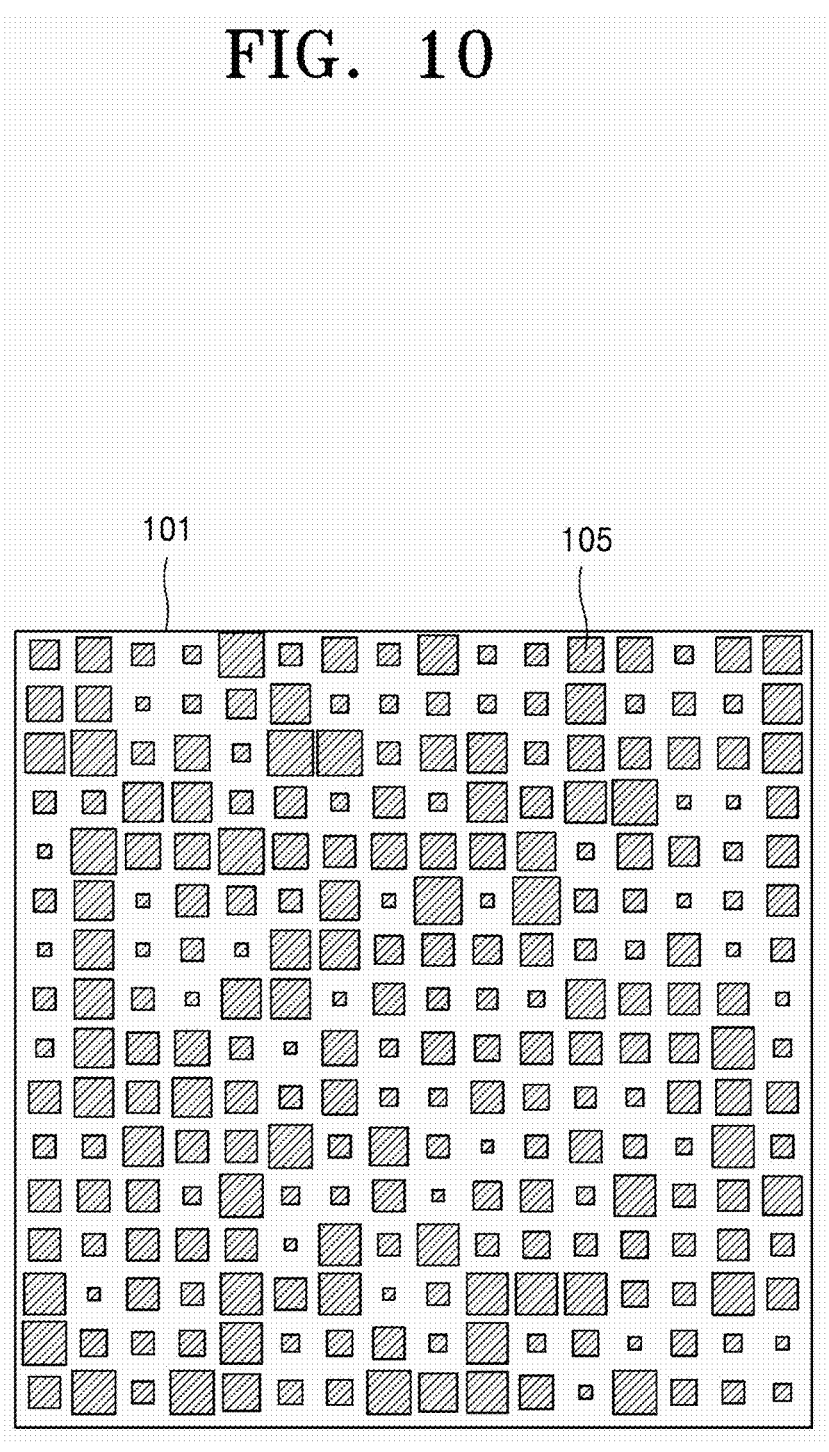
FIG. 10 is a plan view schematically illustrating a random metasurface.

FIGS. 8 and 9 exemplarily illustrate an example arrangement of the scattering medium 20 and the light-receiving sensor 11 of the ultrasensitive spectrometer 10 according to an embodiment, showing an example in which the scattering medium 20 is composed of a stacked structure of a plurality of metasurfaces 100 having an array of meta-atoms 105. When the scattering medium 20 is composed of a stacked structure of a plurality of metasurfaces 100, there may be a separation distance between metasurfaces. In addition, at least one of the plurality of metasurfaces 100 forming the scattering medium 20 may include a random metasurface as illustrated in FIG. 10. FIG. 10 is a plan view schematically illustrating a random metasurface 101.

Referring to FIGS. 8 and 9, the scattering medium 20 may include a plurality of metasurfaces 100 configured to form a speckle pattern on the sensing surface 11a of the light-receiving sensor 11, and at least one of the plurality of metasurfaces 100 may be a random metasurface 101 as exemplarily illustrated in FIG. 10.

For example, as shown in FIG. 8, the plurality of metasurfaces 100 may include first and second metasurfaces 110 and 120 arranged in front of the light-receiving sensor 11 spaced apart from each other in a stacking direction. Each of the first and second metasurfaces 110 and 120 may have an array of meta-atoms 105.

The first metasurface 110 may be at a separation distance D1 from the sensing surface 11a of the light-receiving sensor 11. The second metasurface 120 may be at a separation distance D2 from the first metasurface 110. Each of the first and second metasurfaces 110 and 120 may be, for example, a random metasurface 101 as illustrated in FIG. 10. Alternatively, only one of the first metasurface 110 and the second metasurface 120 may be a random metasurface 101.

In another example, the plurality of metasurfaces 100 may include three or more metasurfaces spaced apart from each other in a stacking direction. For example, as shown in FIG. 9, the plurality of metasurfaces 100 may further include a third metasurface 130 in addition to the first and second metasurfaces 110 and 120, at front of the light-receiving sensor 11 apart from each other in the stacking direction. Each of the first to third metasurfaces 110, 120, and 130 may have an array of meta-atoms 105. The first metasurface 110 may be at a separation distance D1 from the sensing surface 11a of the light-receiving sensor 11. The second metasurface 120 may be at a separation distance D2 from the first metasurface 110. The third metasurface 130 may be at a separation distance D3 from the second metasurface 120. Each of the first to third metasurfaces 110, 120, and 130 may be, for example, a random metasurface 101 as exemplarily illustrated in FIG. 10. Only one or two of the first to third metasurfaces 110, 120, and 130 may be the random metasurface 101.

FIGS. 8 and 9 each show an example in which the scattering medium 20 of the ultrasensitive spectrometer 10 includes two and three metasurfaces 100. However, this is merely an example, and embodiments are not limited thereto. Various modifications may be made therein. The number of metasurfaces constituting the scattering medium 20, the separation distance between metasurfaces, the number of applied random metasurfaces 101, the disordered size distribution of meta-atoms 105, or the like may be varied according to an intended wavelength sensitivity or set spectral range.

As exemplarily illustrated in FIGS. 8 and 9, the plurality of metasurfaces 100 constituting the scattering medium 20 may be spaced apart from each other in the stacking direction (positive or negative z-axis direction), and each of the plurality of metasurfaces 100 may have an array of meta-atoms 105. At least one of the plurality of metasurfaces 100 may be a random metasurface 101 in which meta-atoms 105 are arranged in a disordered size distribution as exemplarily illustrated in FIG. 10, and the plurality of metasurfaces 100 may form a speckle pattern on the sensing surface 11a of the light-receiving sensor 11. For example, the random metasurface 101 may have meta-atoms 105 arranged in a disordered size distribution to exhibit random phase map information with respect to incident plane light. For example, each of the plurality of metasurfaces 100 may be a random metasurface 101 in which meta-atoms 105 are arranged in a disordered size distribution to exhibit random phase map information with respect to incident plane light. In this case, a random phase map may be defined by phase delay values according to coordinates in a spatial domain. In addition, each of the plurality of metasurfaces 100 may include a random metasurface 101 with different disordered size distributions of meta-atoms 105.

As described above, when the scattering medium 20 is formed by a stacked structure of the plurality of metasurfaces 100 each having an array of meta-atoms 105, previously predicted speckle pattern information about the scattering medium 20 may be phase map information about the random metasurface 101 of the plurality of metasurfaces 100, that is, random phase map information, and the storage unit 30 may store the random phase map information. The random phase map information of the random metasurface 101 may be defined by phase delay values according to coordinates, and the phase delay values may be stored in the storage unit 30. Here, when the plurality of metasurfaces 100 include at least one regular metasurface in which meta-atoms 105 are regularly distributed, phase map information about the regular metasurface may also be stored in the storage unit 30. In this manner, the storage unit 30 may store phase map information about the plurality of metasurfaces 100 constituting the scattering medium 20.

In addition, meta-atoms 105 may be formed at the same height and/or may be regularly positioned on each of the plurality of metasurfaces 100, and the sizes of the meta-atoms 105 may be irregular. As a result, a disordered array of meta-atoms 105 exhibiting a disordered phase delay distribution may be formed.

For example, as exemplarily illustrated in FIGS. 8 and 9, meta-atoms 105 may be formed at the same height and may be regularly arranged on each of the plurality of metasurfaces 100, and only the size distribution of meta-atoms 105 may be irregular. As a result, a disordered array of meta-atoms 105 exhibiting a disordered phase delay distribution may be formed. Variations in the size of meta-atoms 105 may be obtained by, for example, variations in a horizontal width and/or a longitudinal width of meta-atoms 105. For example, the meta-atoms 105 may have a quadrangular pillar shape or a pillar shape having various cross-sectional shapes.

In addition, the meta-atoms 105 of the plurality of metasurfaces 100 may be periodically positioned. In this case, the meta-atoms 105 may be arranged with the same period for all of the plurality of metasurfaces 100, with different periods for some of the plurality of metasurfaces 100, or with different periods for each of the plurality of metasurfaces 100. In addition, the meta-atoms 105 may have the same height on all of the plurality of metasurfaces 100, different heights on some of the plurality of metasurfaces 100, or different heights respectively on the plurality of metasurfaces 100. In addition, the meta-atoms 105 may have different heights even on one metasurface.

In this manner, the meta-atoms 105 of the plurality of metasurfaces 100 may be periodically positioned and may have irregular sizes corresponding to a random phase map to be implemented, thereby forming a disordered arrangement. For example, the meta-atoms 105 may form a disordered arrangement exhibiting a disordered phase delay distribution when the meta-atoms 105 are periodically arranged and have the same height and different widths (or diameters). When the meta-atoms 105 have different widths, an effective refractive index may vary according to the widths of the meta-atoms 105, and thus, the degree of phase delay may be different. The meta-atoms 105 may have different widths within the range of about 60 nm to about 300 nm, but are not limited thereto. Phase may be modulated by the disordered arrangement of the meta-atoms 105, and thus, a speckle pattern may be formed by resultant interference.

In addition, the plurality of metasurfaces 100 may be spaced apart from each other by spacer layers (not shown).

As shown in FIG. 8, when the plurality of metasurfaces 100 include the first and second metasurfaces 110 and 120, one of the first and second metasurfaces 110 and 120 may be formed on a substrate (not shown), and the first and second metasurfaces 110 and 120 may be spaced apart from each other by a spacer layer therebetween. For example, the first metasurface 110 may be formed on the substrate, and a spacer layer may be formed between the first metasurface 110 and the second metasurface 120. The first metasurface 110 may be configured as a structure in which meta-atoms 105 are disorderly arranged on the substrate. The spacer layer may be formed on the first metasurface 110, and the second metasurface 120 may be formed on the spacer layer. The second metasurface 120 may be configured as a structure in which meta-atoms 105 are disorderly arranged on the spacer layer. When the spacer layer is formed, spaces between the meta-atoms 105 of the first metasurface 110 may be filled with a spacer layer material. Spaces between the meta-atoms 105 of the outermost metasurface, for example, the second metasurface 120, may or may not be filled with the spacer layer material.

In addition, as illustrated in FIG. 9, when the plurality of metasurfaces 100 further include the third metasurface 130, a spacer layer may be further formed on the second metasurface 120, and the third metasurface 130 may be formed on the spacer layer. The third metasurface 130 may have a configuration in which meta-atoms 105 are disorderly arranged on the spacer layer. When the spacer layers are formed, spaces between the meta-atoms 105 of the first metasurface 110 and the second metasurface 120 may be filled with the spacer layer material. Spaces between the meta-atoms 105 of the outmost metasurface, that is, the third metasurface 130, may or may not be filled with the spacer layer material.

In another example, spaces between the meta-atoms 105 may be filled with another material different from the spacer layer material, or may be left empty. Here, the spacer layer material or the other material filling the spaces between the meta-atoms 105 may have a refractive index that is different from the refractive index of the meta-atoms 105.

The substrate and the spacer layers may include a transparent material. At least one of the substrate and the spacer layers may include, for example, an amorphous silicon oxide such as fused silica, but is not limited thereto and may include various transparent materials. Here, metasurfaces may be also formed on each substrate and may be coupled to each other in a state in which the metasurfaces are spaced apart from each other. The spatial arrangement structure and the materials of metasurfaces may be also applied even when the plurality of metasurfaces 100 include different numbers of metasurfaces from those described above.

As described above, when the scattering medium 20 is formed by a stacked structure of the plurality of metasurfaces 100 each having an array of meta-atoms 105, previously predicted speckle pattern information of the scattering medium 20 may be phase map information about the plurality of metasurfaces 100, that is, random phase map information, and the storage unit 30 may store the random phase map information.

As described above, the scattering medium 20 may include the plurality of metasurfaces 100 spaced apart from each other, and at least one of the plurality of metasurfaces 100 may include a random metasurface. The number of metasurfaces, the separation distance between the metasurfaces, and the separation distance D1 between a final metasurface (for example, the first metasurface 110) and the sensing surface 11a of the light-receiving sensor 11 may be determined to form a random speckle pattern guaranteeing a set spectral resolution. For example, the number of metasurfaces, the separation distance between the metasurfaces, the separation distance between the final metasurface and the sensing surface 11a of the light-receiving sensor 11, a degree of disorder of at least one of the metasurfaces, and the like may be determined to form a distinguishable random speckle pattern for each wavelength in units of nanometers (nm) or sub-nanometers (sub-nm), for example, in units of about 0.1 nm in a wavelength range of interest such as a wavelength range of about 400 nm to about 700 nm.

To this end, the plurality of metasurfaces 100 may be provided to form a speckle pattern overall on the sensing surface 11a of the light-receiving sensor 11, and at least one of the number of metasurfaces, the separation distance between the metasurfaces, and the separation distance D1 between the final metasurface (for example, the first metasurface 110) and the sensing surface 11a of the light-receiving sensor 11 may be determined such that speckle sizes of at least some speckles of the speckle pattern formed on the sensing surface 11a of the light-receiving sensor 11 may be greater than the pixel size of the light-receiving sensor 11. In addition, the degree of disorder of the plurality of metasurfaces 100 may be limited such that the average speckle size of the speckle pattern may be greater than the pixel size of the light-receiving sensor 11. For example, the degree of disorder of the plurality of metasurfaces 100 may be limited such that the average speckle size of the speckle pattern may be greater than twice the pixel size of the light-receiving sensor 11.

For example, the plurality of metasurfaces 100 may include two to ten metasurfaces arranged apart from each other. In addition, for example, the metasurfaces may be spaced apart each other at intervals of micrometers (μm) to millimeters (mm). In addition, the separation distance between the sensing surface 11a of the light-receiving sensor 11 and the first metasurface 110 adjacent to the light-receiving sensor 11 may be greater than the separation distance between metasurfaces. The distance between the sensing surface 11a of the light-receiving sensor 11 and the first metasurface 110 adjacent to the light-receiving sensor 11 may be within the range of about 1 μm to about 10 cm, for example, 100 μm.

Figure 11:
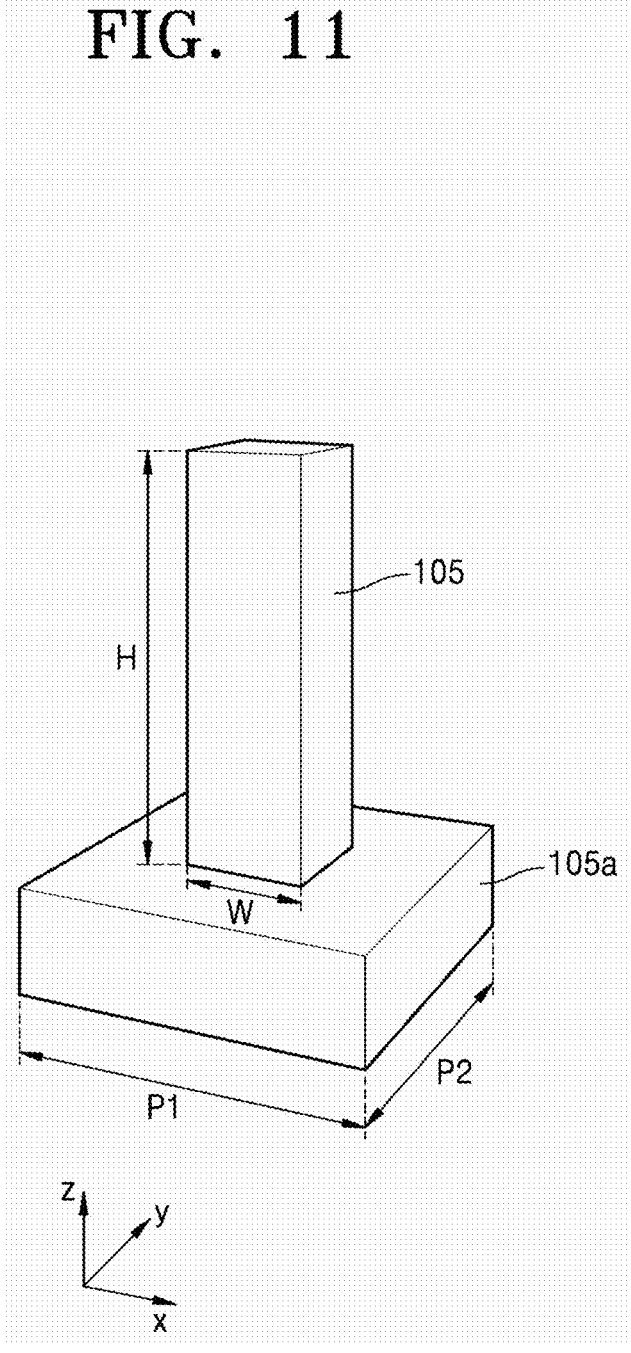
FIG. 11 is a perspective view illustrating an example of a meta-atom applicable to the metasurfaces of FIGS. 8 to 10.

FIG. 11 is a perspective view illustrating an example of a meta-atom 105 applicable to the metasurfaces 101, 110, 120, and 130 of FIGS. 8 to 10.

Referring to FIG. 11, the meta-atom 105 may be formed in a square pillar shape on a base layer 105a. The base layer 105a may correspond to any one of the substrates and the spacer layers described above. For example, the base layer 105a may include an amorphous silicon oxide such as fused silica. Alternatively, the base layer 105a may include another transparent material.

At least one of the width W and the height H of the meta-atom 105 may be sub-wavelength. In addition, meta-atoms 105 may be arranged with periods P1 and P2 that may or may not be sub-wavelength. Referring to FIG. 11, P1 refers to an arrangement period of meta-atoms 105 in a horizontal direction (x-axis direction), and P2 refers to an arrangement period of meta-atoms 105 in a longitudinal direction (y-axis direction). The arrangement periods P1 and P2 of meta-atoms 105 may be constant in the horizontal direction and the longitudinal direction. That is, P1 may be equal to P2 (P1=P2). In another example, the arrangement period P1 of meta-atoms 105 in the horizontal direction may be different from the arrangement period P2 of the meta-atoms 105 in the longitudinal direction.

The width W of the meta-atoms 105 may vary depending on the position of the meta-atoms 105. The meta-atoms 105 may include a material of which the effective refractive index varies according to the width W of the meta-atoms 105. The meta-atoms 105 may include, for example, a silicon nitride such as $Si_3N_4$. In addition, the material of the meta-atoms 105 may selected from various materials as long as the effective refractive index of the meta-atoms 105 varies according to the width W of the meta-atoms 105.

Meta-atoms 105 of the plurality of metasurfaces 100 forming the scattering medium 20 may be, for example, made of silicon nitride, and may be formed on the base layer 105a including an amorphous silicon oxide with a period (P1=P2) of about 350 nm in the horizontal direction and the longitudinal direction, and with a height H of about 900 nm to form a disordered size arrangement by varying the width W of the meta-atoms 105. Here, the periods P1 and P2, the height H, and the material of the meta-atoms 105 are merely an example, and embodiments are not limited thereto. The periods P1 and P2, the height H, and the material of the meta-atoms 105 may vary according to design conditions.

The meta-atoms 105 applied to the plurality of metasurfaces 100 forming the scattering medium 20 may have a square pillar shape or other pillar shapes having various cross-sectional shapes such as a circular cross-sectional shape, an elliptical cross-sectional shape, a rectangular cross-sectional shape, a square-ring cross-sectional shape, a circular-ring cross-sectional shape, or a cross-shaped cross-sectional shape.

FIGS. 12A to 12H are plan views illustrating various exemplary shapes of meta-atoms 105 that may be applied to the metasurface 100.

Figure 12A:
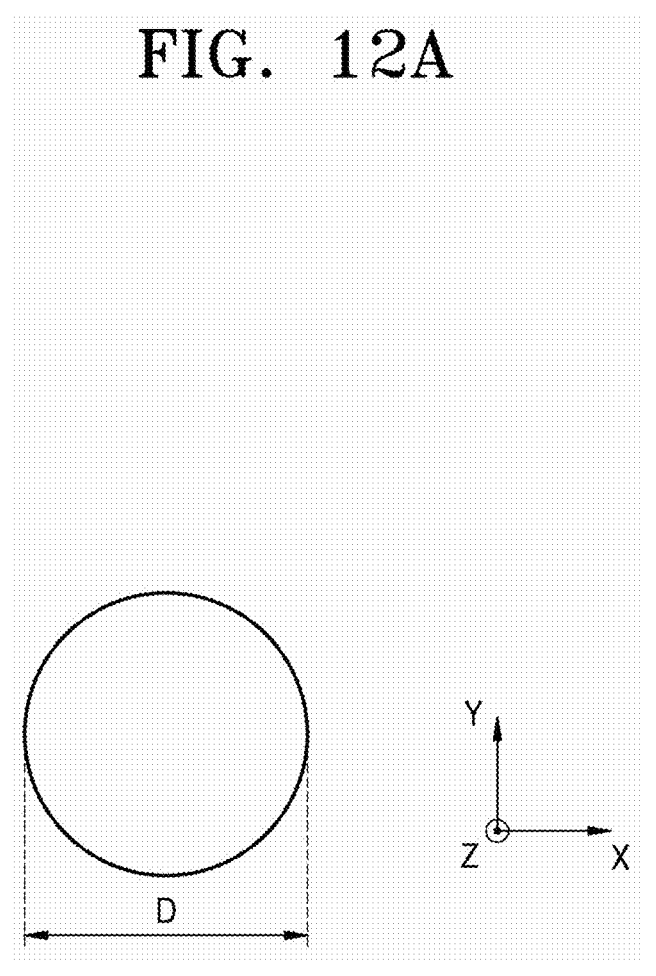
Figure 12B:
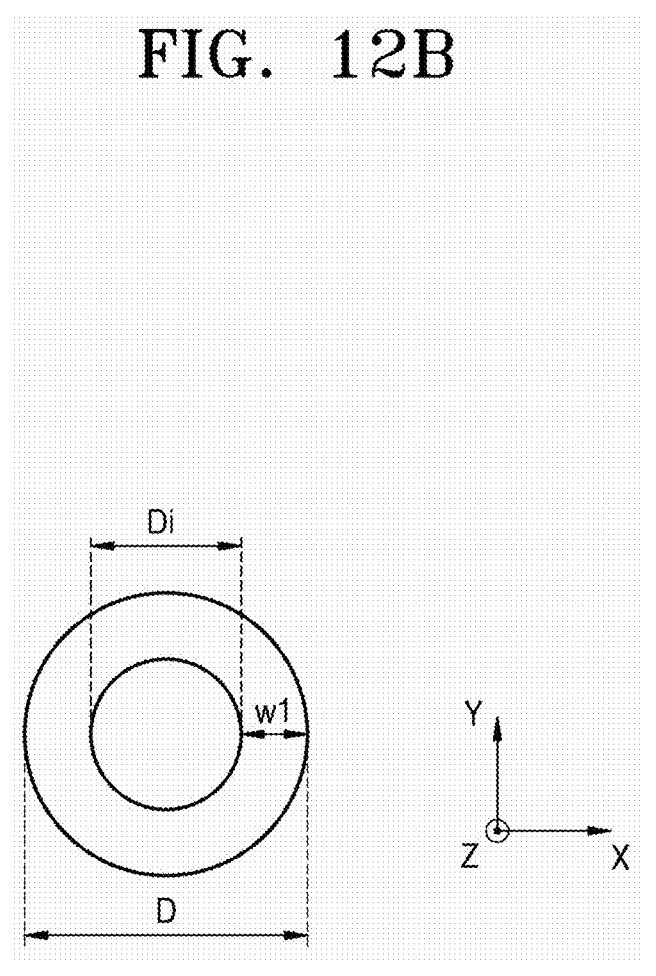
Figure 12C:
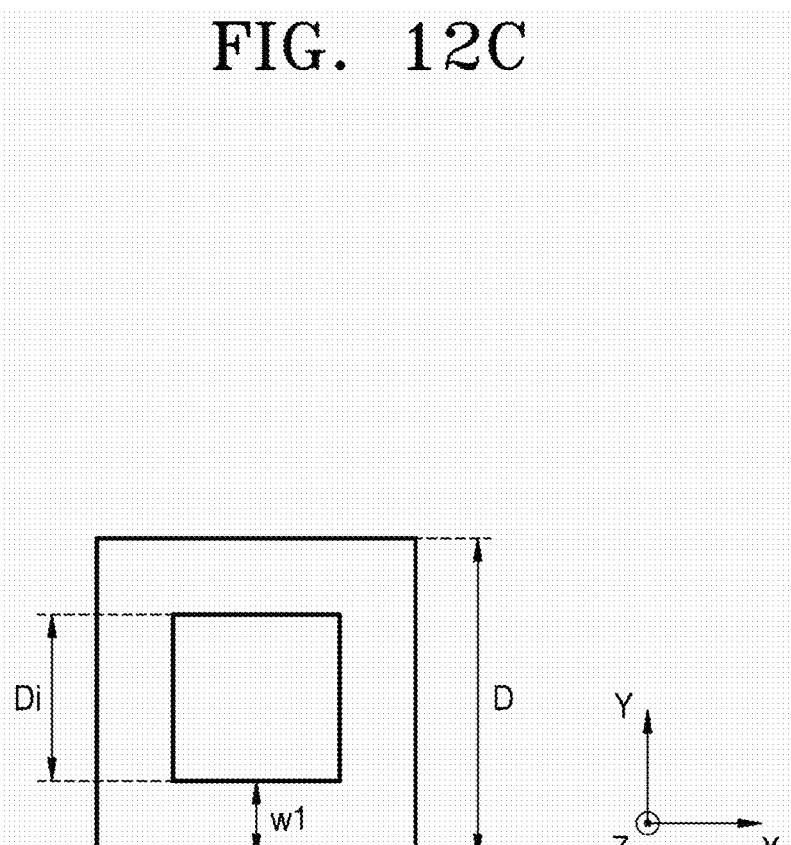
Figure 12D:
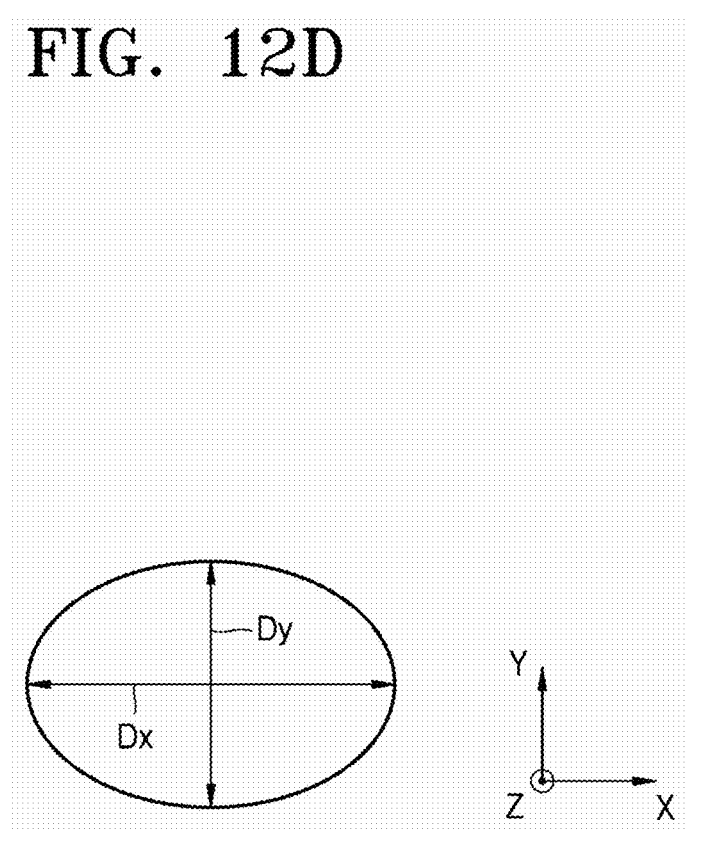
Figure 12E:
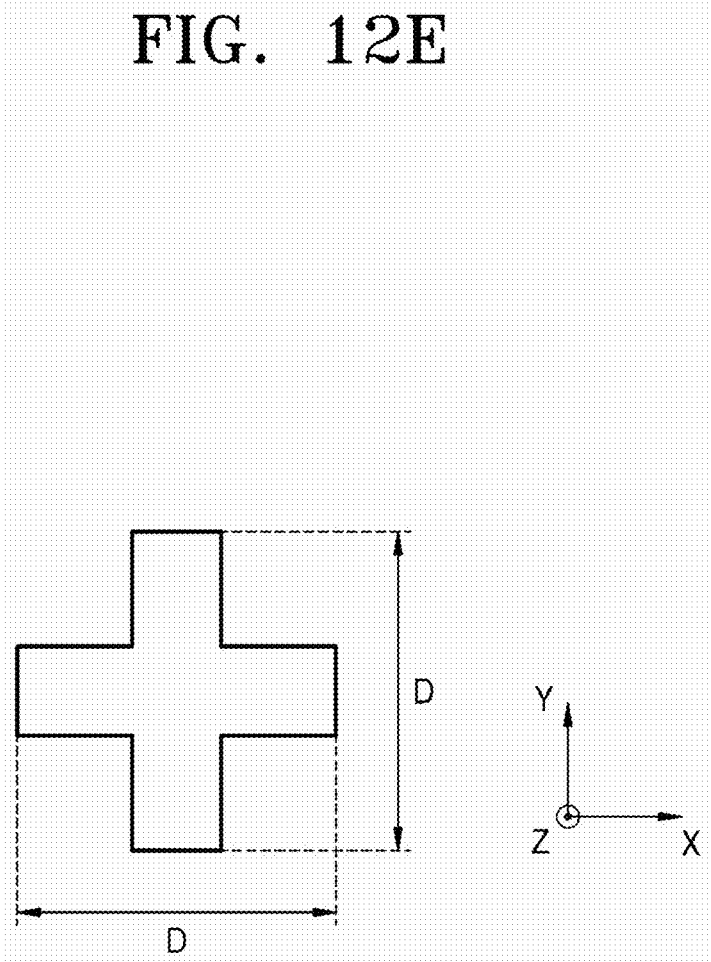
Figure 12F:
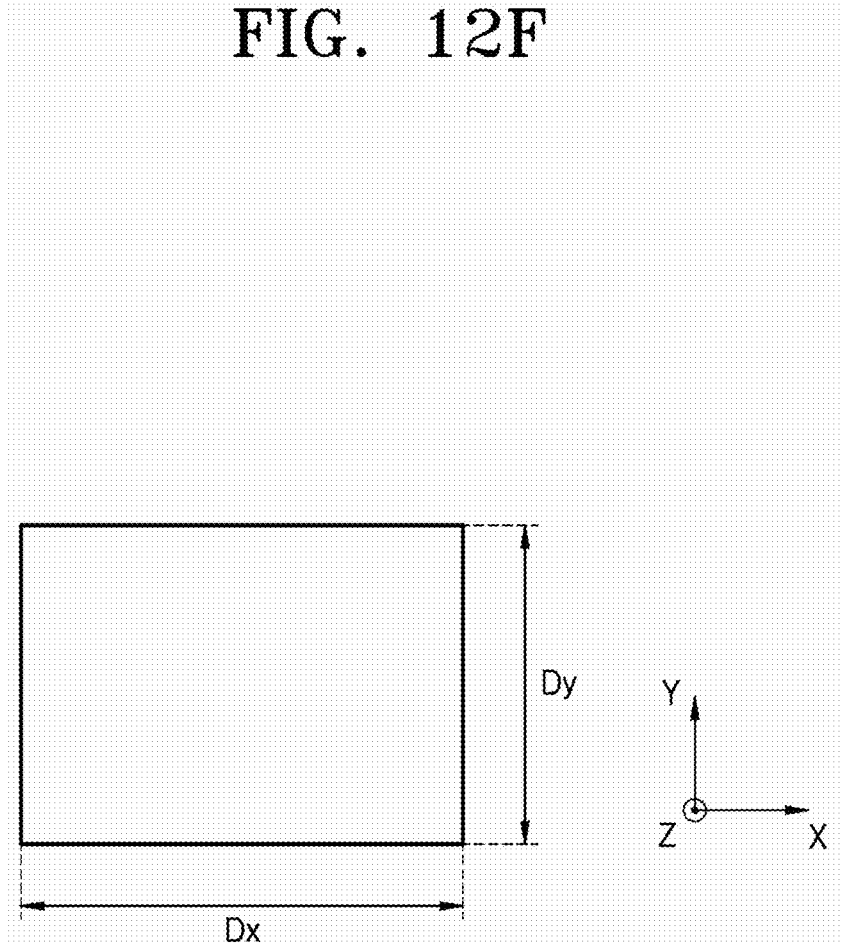
Figure 12G:
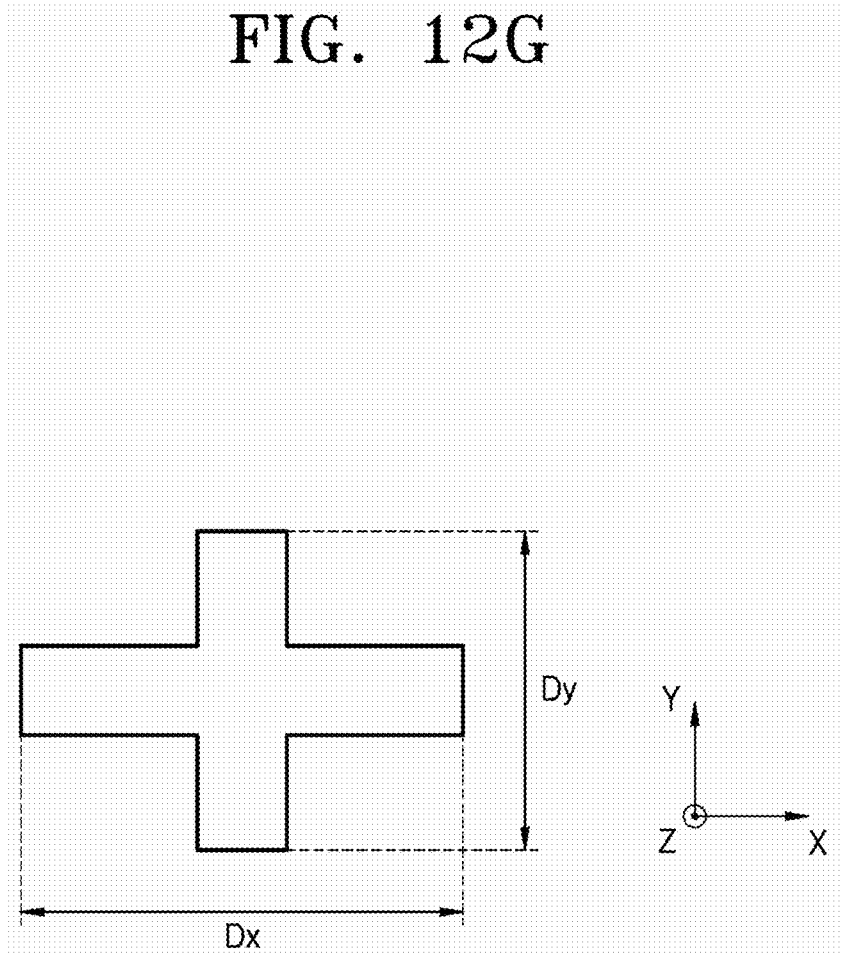
Figure 12H:
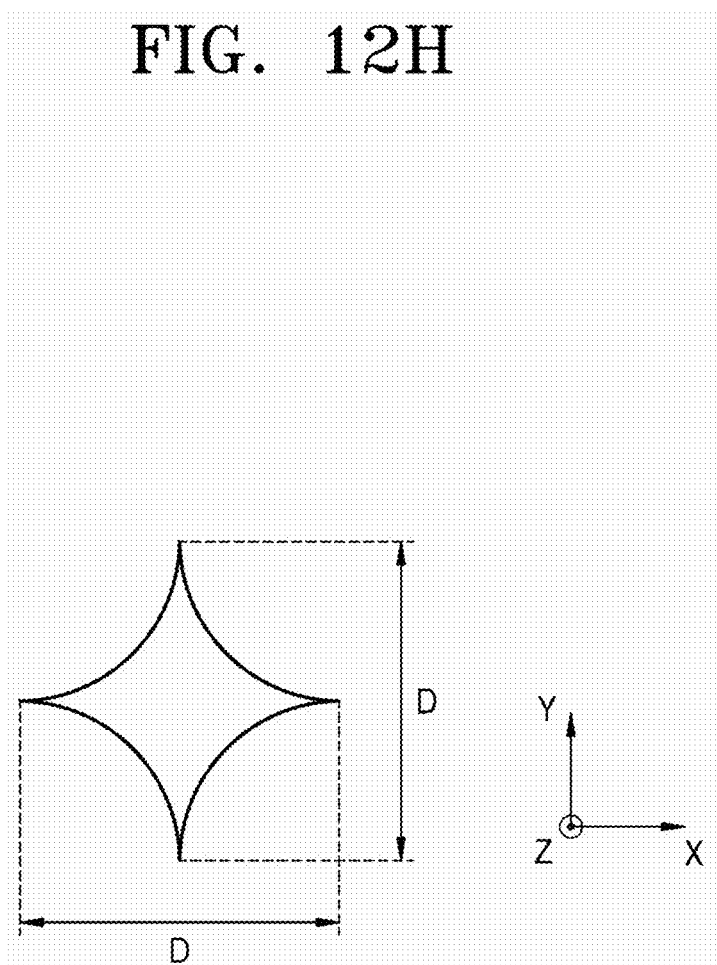

As shown in FIG. 12A, the cross-sectional shape of the meta-atoms 105 may be circular with a diameter D. The diameter D of the meta-atoms 105 having a circular pillar shape may be sub-wavelength. As shown in FIGS. 12B and 12C, the cross-sectional shape of the meta-atoms 105 may be a circular ring shape or a square ring shape each having an outer diameter D and an inner diameter Di. The width W1 of each ring shape may be sub-wavelength. As shown in FIG. 12D, the cross-sectional shape of the meta-atoms 105 may be an elliptical shape having a major axis Dx in a first direction (for example, X-axis direction) that is different from a minor axis Dy in a second direction (for example, Y-axis direction). As shown in FIG. 12E, the meta-atoms 105 may have a cross-shaped cross-sectional shape. As shown in FIGS. 12F and 12G, the cross-sectional shape of the meta-atoms 105 may be a rectangular shape or a cross shape each having a length Dx in the first direction (for example, X-axis direction) that is different from a length Dy in the second direction (for example, Y-axis direction). In addition, as shown in FIG. 12H, the cross-sectional shape of the meta-atoms 105 may have a plurality of concave arcs.

As described above, the meta-atoms 105 applicable to the plurality of metasurfaces 100 of forming scattering medium 20 may have pillar shapes having various cross-sectional shapes as well as a square pillar shape.

Figure 13:
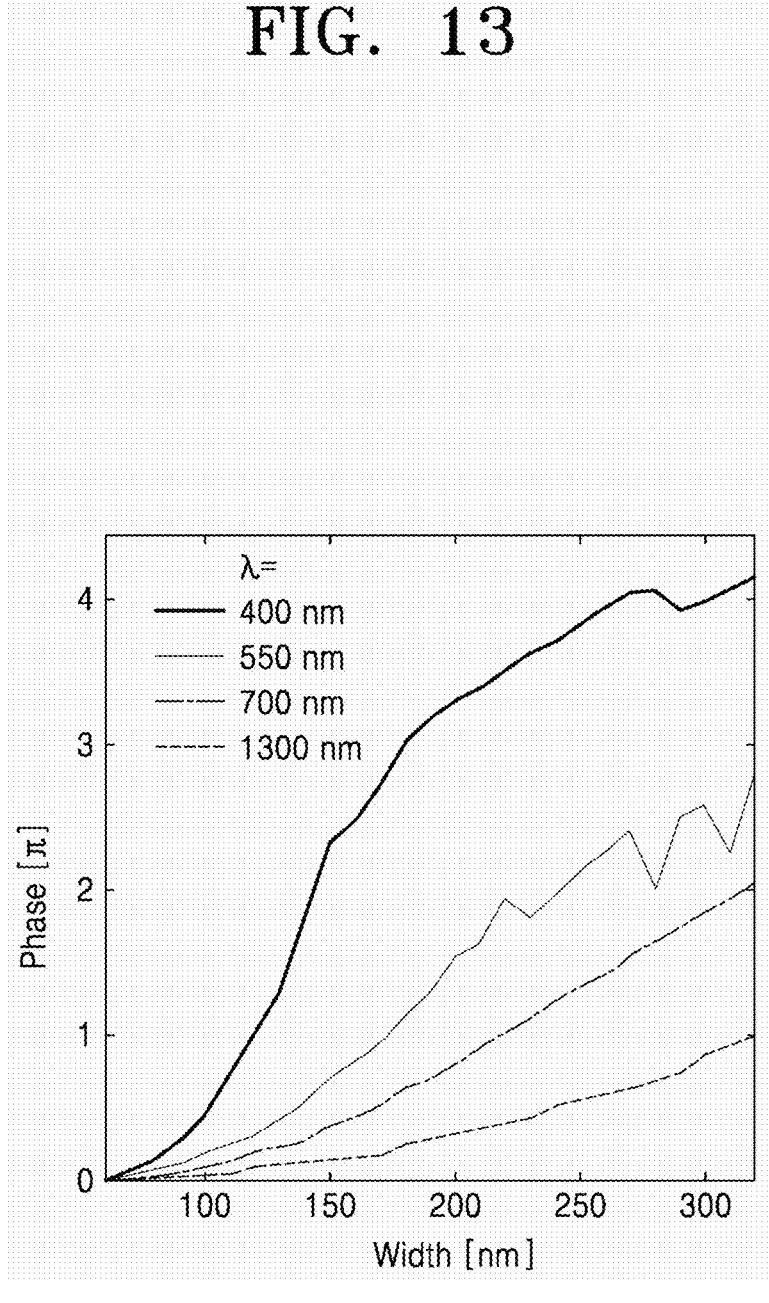
FIG. 13 is a graph illustrating a relationship between the width of meta-atoms and the phase delay of light passing through the meta-atoms.

FIG. 13 is a graph illustrating a relationship between the width of meta-atoms 105 and the phase delay of light passing through the meta-atoms 105. FIG. 13 shows a relationship between a width of the meta-atoms 105 and a phase delay occurring by the meta-atoms 105 when the meta-atoms 105 are made of $Si_3N_4$, have a rectangular pillar shape and a height of about 900 nm, and are arranged with a period of about 350 nm.

As shown in FIG. 13, the degree of phase delay varies according to the width of the meta-atoms 105 and the wavelength of light. Thus, the relationship between the width of the meta-atoms 105 and the phase delay occurring by the meta-atoms 105 may be recorded as lookup table data, and the lookup table data may be stored in the storage unit 30. In addition, based on this relationship, the metasurfaces 101, 110, 120, and 130 may be formed by substituting a two-dimensional random phase map with a width map (process design diagram) of two-dimensional meta-atoms 105.

Figure 14:
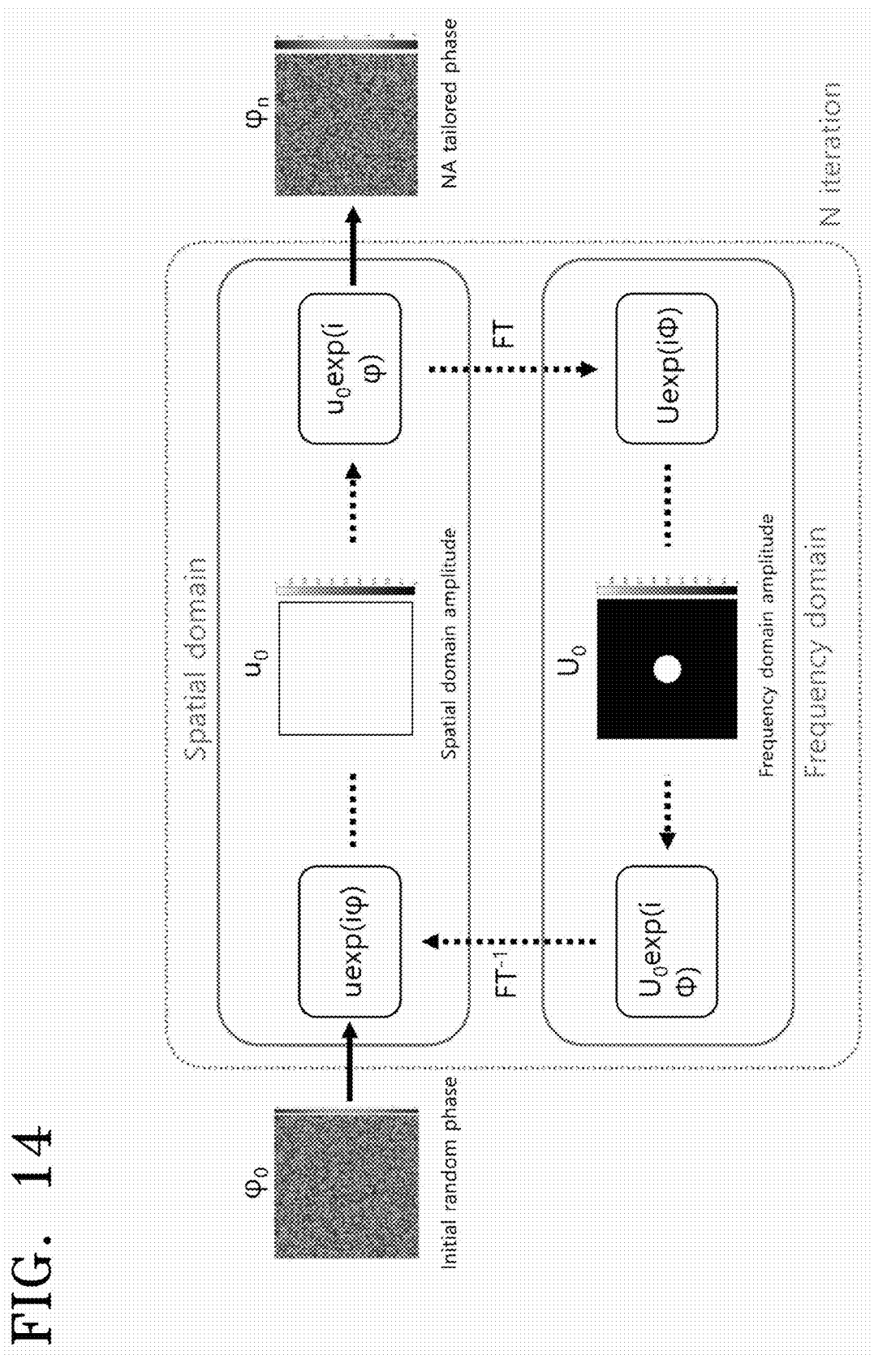
FIG. 14 is a diagram schematically illustrating a method of designing a random metasurface having a limited degree of disorder to adjust a speckle size of a speckle pattern.

FIG. 14 is a diagram schematically illustrating a method of designing a random metasurface having a limited degree of disorder to adjust the speckle size of a speckle pattern.

Referring to FIG. 14, a phase shift that incident plane light undergoes due to a random metasurface may be defined by a random phase map of the random metasurface, and such random phase map is a function defined by phase delay values according to coordinates in a spatial domain.

For an initial random phase ($\varphi_0$) map, an optimization algorithm may be performed by repeatedly applying intensity constraints while alternating between a spatial domain and a Fourier domain (frequency domain). The optimization algorithm may be repeated N times (N iterations) while alternating between the spatial domain and the Fourier domain (frequency domain). For example, the Gerchberg-Saxton algorithm may be used as the iterative optimization algorithm.

The Fourier transform (FT) may be performed from the spatial domain to the Fourier domain, and the inverse Fourier transform ($FT^{-1}$) may be performed from the Fourier domain to the spatial domain. In addition, for example, a spatial domain amplitude $u_0$ may not be limited, a Fourier domain amplitude $U_0$ (frequency domain amplitude $U_0$) may be limited, and thus a Fourier domain component of the random phase map may be limited. The limited Fourier domain component may be expressed by a numerical aperture NA. By limiting the Fourier domain component NA of the random phase map, the speckle size may be adjusted. That is, a random phase map with a tailored phase $\varphi_n$ of a numerical aperture NA may be obtained to implement a metasurface having a limited degree of disorder as intended.

As described above, a two-dimensional random phase map corresponding to a metasurface having a limited degree of disorder may be obtained by performing an iterative optimization algorithm that imposes intensity constraints, and each metasurface may be produced by substituting the two-dimensional random phase map with a width map (process design diagram) of two-dimensional meta-atoms. Owing to a stacked structure of the plurality of metasurfaces 100 each formed as described above, a random speckle pattern guaranteeing a set spectral resolution in an analysis wavelength range may be formed, and an optimization algorithm for designing each metasurface may be performed such that the average speckle size of the speckle pattern may be greater than the pixel size of the light-receiving sensor 11, for example, greater than twice the pixel size of the light-receiving sensor 11.

Figure 15:
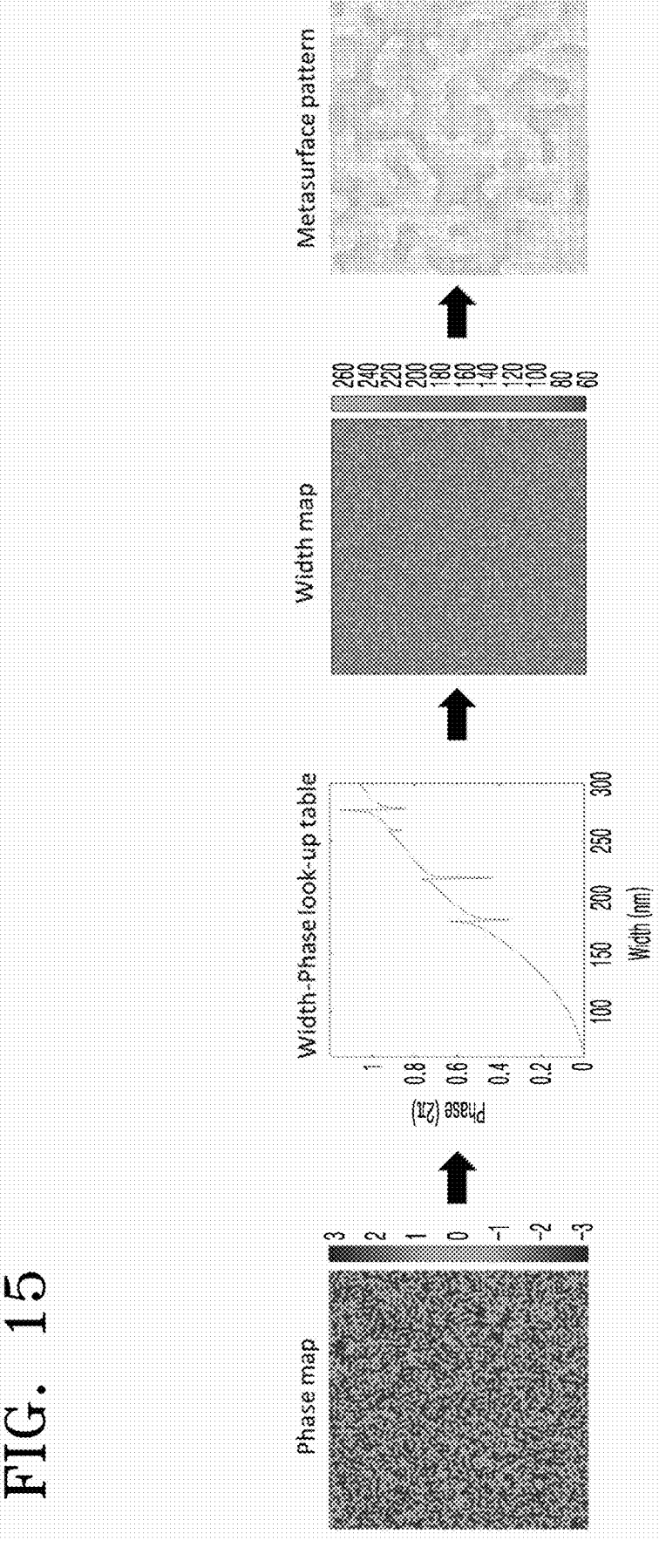
FIG. 15 is a diagram illustrating a process of fabricating a random metasurface from a designed random phase map.

FIG. 15 shows an exemplary process of fabricating a random metasurface from a designed random phase map.

As shown in FIG. 15, a designed random phase map may be converted into a width map of meta-atoms 105 based on a lookup table indicating a relationship between the width of meta-atoms 105 and a phase delay occurring by the meta-atoms 105, and a metasurface pattern in which meta-atoms 105 are arranged with a limited degree of disorder may be fabricated using the width map.

In addition, according to the theory of coherence relation, a spectral resolution $\Delta\lambda$ by a scattering medium may be proportional to a free scattering distance in the scattering medium and may be inversely proportional to the square of the thickness of the scattering medium.

When the scattering medium 20 is formed by a stacked structure of a plurality of metasurfaces, a free scattering distance in the scattering medium 20 corresponds to an inter-metasurface distance $\Delta L$, and the thickness of the scattering medium 20 is approximately equal to the product of the inter-metasurface distance $\Delta L$ and a number less than the number of metasurfaces by 1 (number of metasurfaces −1). Thus, the spectral resolution $\Delta\lambda$ may be approximately inversely proportional to the inter-metasurface distance $\lambda L$ and the square of the number of metasurfaces. Here, for example, the inter-metasurface distance $\Delta L$ may correspond to the distances D2 and D3 in FIGS. 8 and 9.

For example, when the scattering medium 20 is formed by a stacked structure of the plurality of metasurfaces 100 spaced apart from each other, the conditions of $\Delta\lambda=\Delta f\times\lambda c^2/c$ and $\Delta f\approx 2c/(N^2\times I_t)$ may be satisfied. Here, $\lambda_c$ refers to a center wavelength, and N refers to the number of metasurfaces. $I_t$ refers to a transport mean free path and may correspond to an inter-metasurface distance. That is, spectral resolution may be improved as the inter-metasurface distance increases and the number of metasurfaces increases, and the inter-metasurface distance and/or the number of metasurfaces may have critical values. In an ideal case, two metasurfaces arranged at a distance of about 200 μm from each other may guarantee a spectral resolution of about 0.1 nm.

Therefore, a spectral resolution by the stacked structure of the plurality of metasurfaces 100 may be controlled using the number of stacked metasurfaces and the distance between the metasurfaces. Thus, factors such as the number of metasurfaces and the distance between stacked metasurfaces may be determined according to a spectral resolution to be implemented.

Figure 16A:
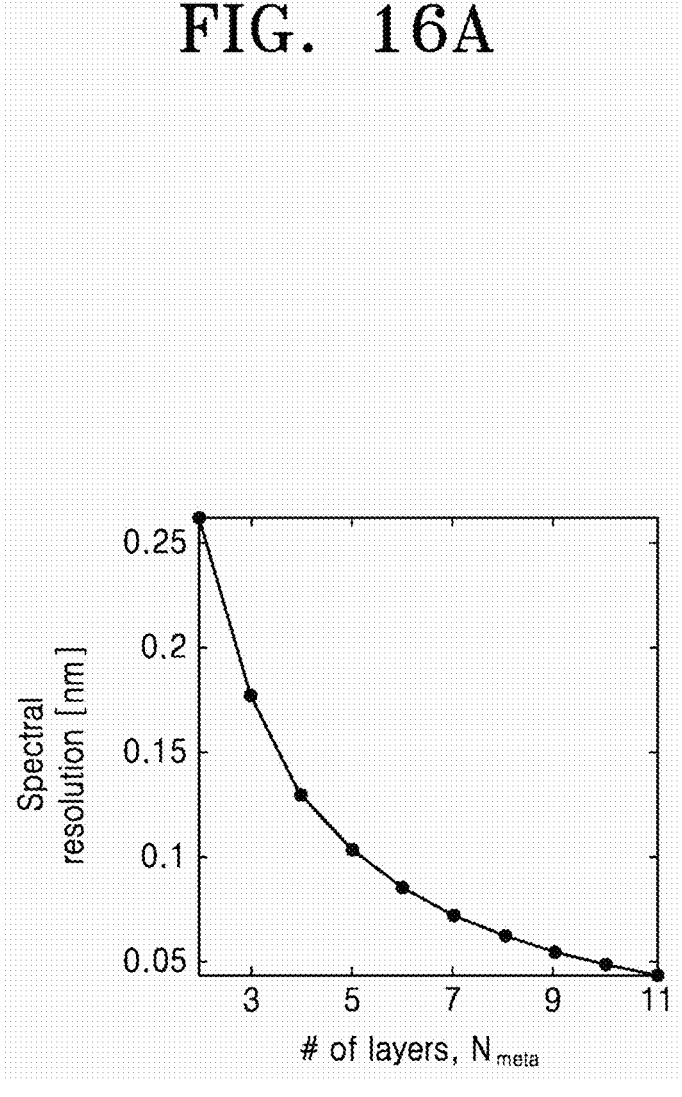
FIG. 16A is a graph illustrating a variation in spectral resolution with respect to the number of stacked metasurfaces.
Figure 16B:
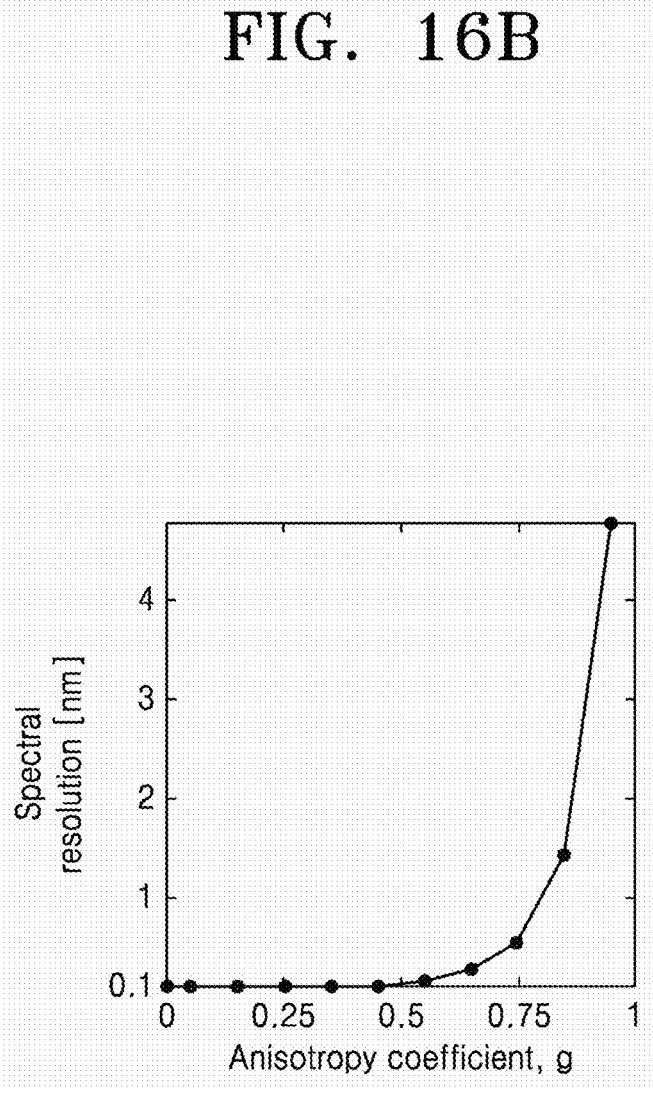
FIG. 16B is a graph illustrating a variation in spectral resolution with respect to an anisotropy coefficient (g) of a metasurface.

FIG. 16A is a graph illustrating variation in spectral resolution with respect to the number of stacked metasurfaces when an inter-metasurface distance $\Delta L$ is about 200 μm, and an anisotropy coefficient g of a metasurface is about zero ($\Delta L=200$ μm, g≈0). FIG. 16B is a graph illustrating a variation in spectral resolution with respect to an anisotropy coefficient of a metasurface when five metasurfaces are stacked at intervals $\Delta L$ of about 200 μm ($N_{meta}=5$, $\Delta L\approx 200$ μm).

As shown in FIGS. 16A and 16B, spectral resolution may be improved as the number $N_{meta}$ of stacked metasurfaces increases and the anisotropy coefficient g of the metasurface decreases. In addition, as the distance $\Delta L$ between stacked metasurfaces increases, spectral resolution may be improved. However, as the number $N_{meta}$ of stacked metasurfaces increases and the anisotropy coefficient g of the metasurface decreases, a speckle size may decrease. Thus, the number of stacked metasurfaces and the anisotropy coefficient g of the metasurface may be determined by considering the speckle size. That is, the number of stacked metasurfaces, the distance $\Delta L$ between metasurfaces, and the anisotropy coefficient g of metasurfaces may be selected to form a speckle pattern having an intended spectral resolution and an average speckle size that is greater than the pixel size of the light-receiving sensor 11, for example, greater than twice the pixel size of the light-receiving sensor 11.

In addition, a speckle pattern may be predicted through the design of random metasurfaces and a simulation thereof, random metasurfaces may be designed and a speckle pattern may be measured by a nano-processing method and an optical holography method. Therefore, reliability in design and fabrication may be evaluated by comparing a measured speckle pattern and a simulated speckle pattern.

Figure 17:
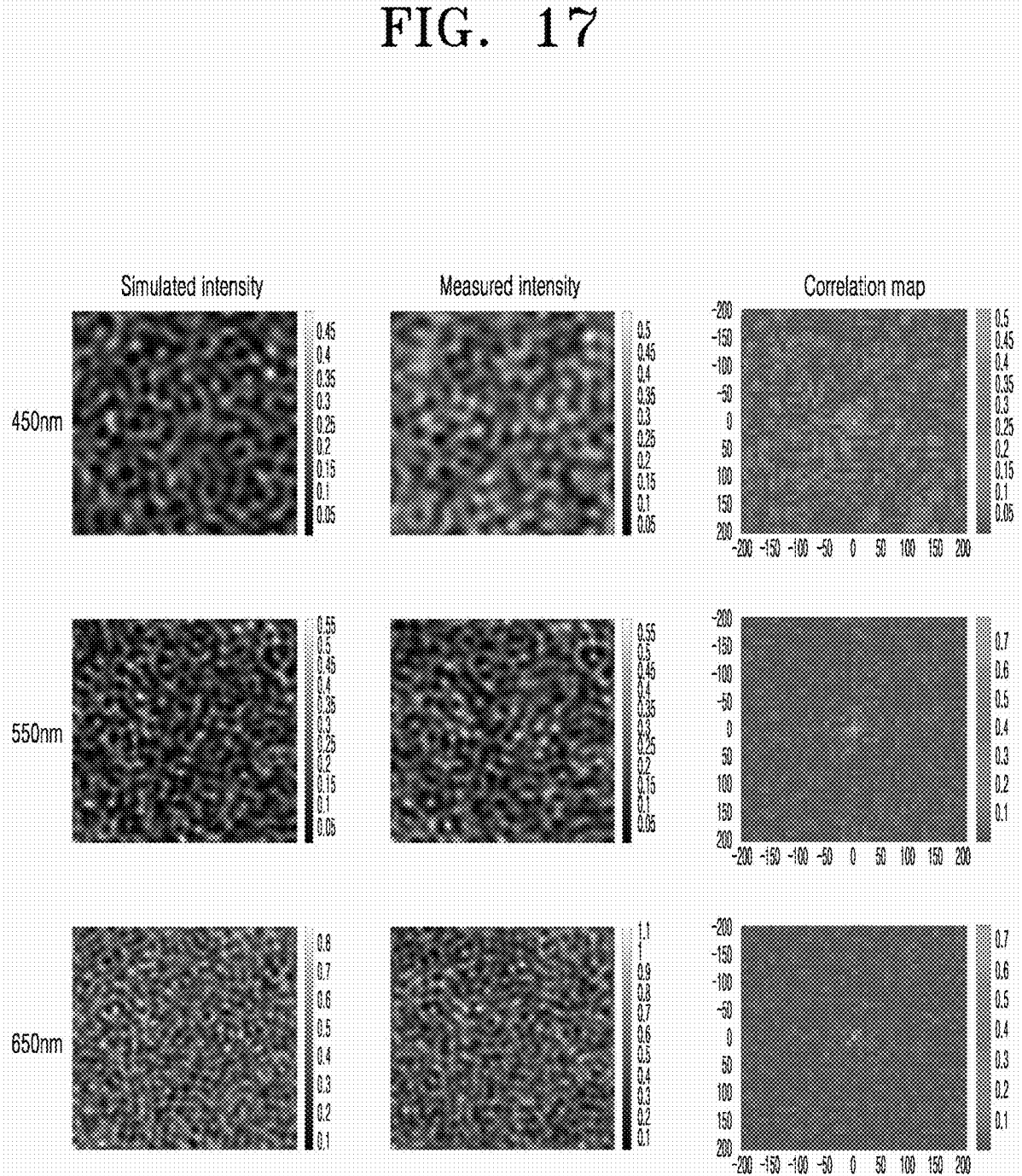
FIG. 17 is a diagram illustrating results of comparing speckle pattern measurements and speckle pattern simulations for a single random metasurface.

FIG. 17 is a diagram exemplarily illustrating results of comparison between speckle pattern measurements and speckle pattern simulations for a single random metasurface. As shown in FIG. 17, a measured intensity distribution and a simulated intensity distribution of a speckle pattern have a high correlation of at least 0.5 to a maximum of 0.8 even though the correlation somewhat varies according to wavelengths. From this, it could be understood that a speckle pattern produced by a stacked structure of the plurality of metasurfaces 100 may be predicted without a calibration process.

Figure 18:
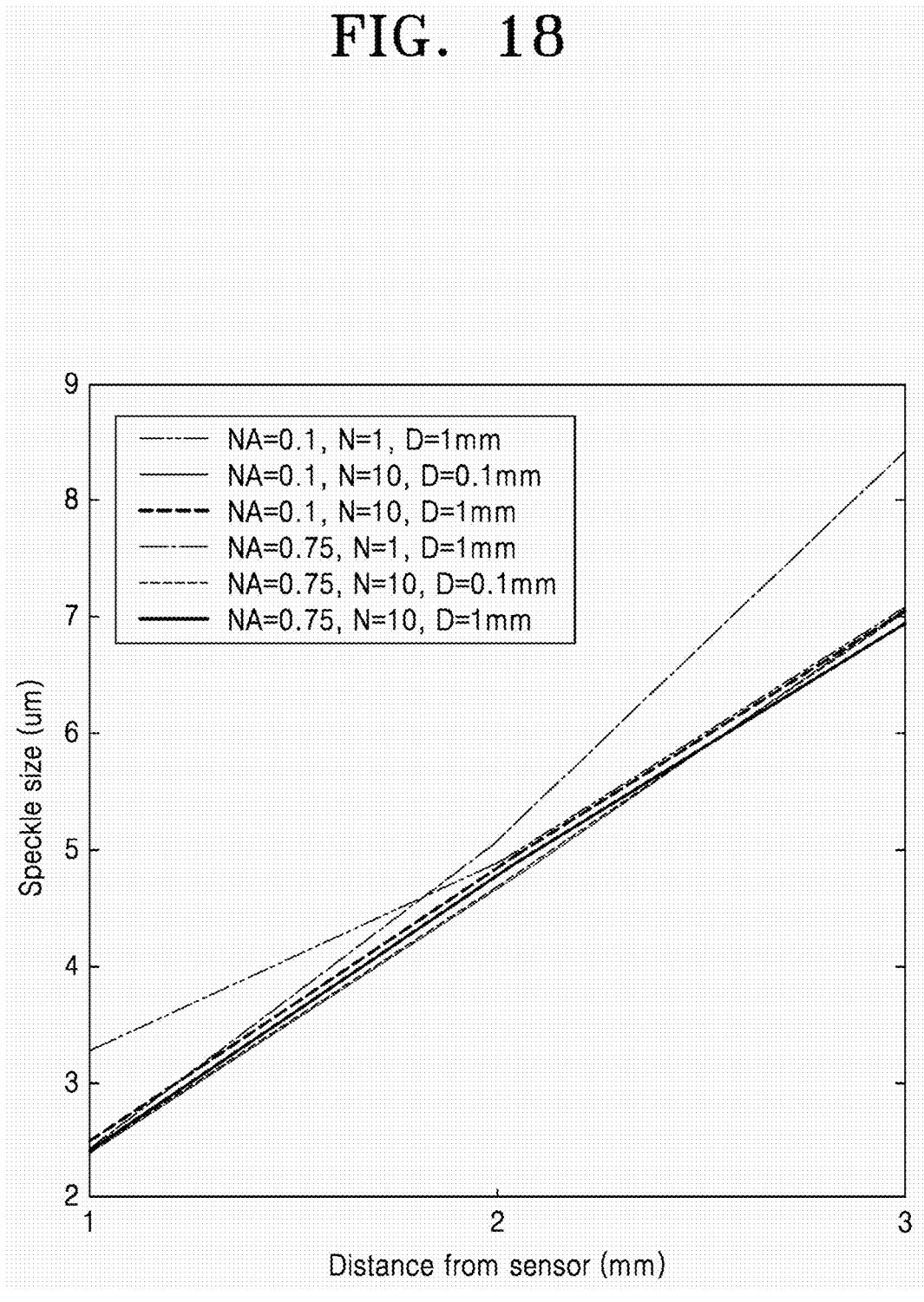
FIG. 18 is a graph illustrating variation in speckle size according to the distance between a final metasurface and the light-receiving sensor.

FIG. 18 is a graph illustrating variation in speckle size according to the distance between a final metasurface and the light-receiving sensor 11. FIG. 18 shows speckle size simulation results according to a tailored numeral aperture NA of a metasurface, a number N of metasurfaces, a distance D between metasurfaces, and a distance D1 between a final metasurface and the light-receiving sensor 11 in a system including a metasurface of about 200 μm in size and the light-receiving sensor 11 with a pixel size of about 1.67 μm.

As shown in FIG. 18, the speckle size of a speckle pattern formed on the sensing surface 11a of the light-receiving sensor 11 may vary according to the distance D1 between the final metasurface (that is, the first metasurface 110) and the sensing surface 11a of the light-receiving sensor 11, and is substantially proportional to the distance D1 between the final metasurface and the sensing surface 11a.

For example, the ultrasensitive spectrometer 10 according to an embodiment may be set to form a speckle pattern with a speckle size twice or more the pixel size of the light-receiving sensor 11 to satisfy the Nyquist condition. For example, considering the simulation results shown in FIG. 18, the ultrasensitive spectrometer 10 according to an embodiment has the light-receiving sensor 11 with a pixel size of about 1.67 μm, the distance D1 between the final metasurface and the sensing surface 11a of the light-receiving sensor 11 may be set to about 1 μm or more to about 10 cm or less, for example, 100 μm, thereby satisfying the Nyquist condition, that is, speckle size=2×1.67 μm.

Figure 19:
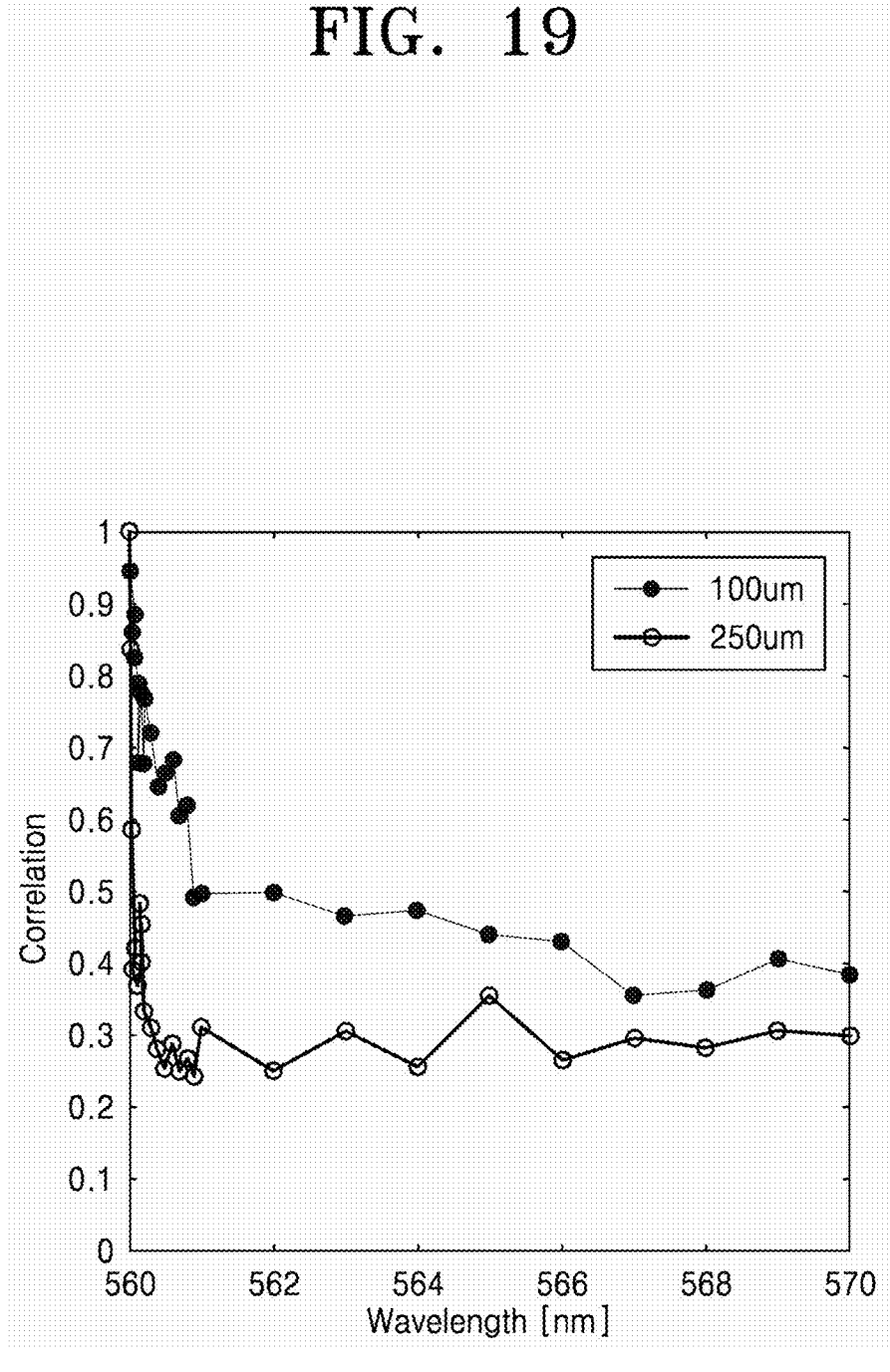
FIG. 19 is a graph illustrating wavelength response characteristics of a scattering medium composed of two random metasurfaces, showing difference in wavelength response characteristics depending on the distance between the two random metasurfaces.

FIG. 19 is a graph illustrating wavelength response characteristics of a scattering medium composed of two random metasurfaces, showing difference in wavelength response characteristics when the distance between the two random metasurfaces is 100 μm and 250 μm. In FIG. 19, the horizontal axis represents wavelength, and the vertical axis represents a correlation between a speckle pattern at each wavelength and a speckle pattern at a wavelength of 560 nm.

Referring to FIG. 19, it could be understood that when the distance between the random metasurfaces varies from 100 μm to 250 μm, variations in speckle pattern are relatively more significant. From this, it could be understood that the spectral resolution $\Delta\lambda$ improves as the distance between the random metasurfaces increases. For example, when the distance between the random metasurfaces changes from 100 μm to 250 μm, the spectral resolution $\Delta\lambda$ may be improved by a factor of 4 times or more. As shown in FIG. 19, by using the distance between random metasurfaces, a scattering medium 20 capable of achieving a specific spectral resolution and the ultrasensitive spectrometer 10 employing the same may be implemented.

Figure 20:
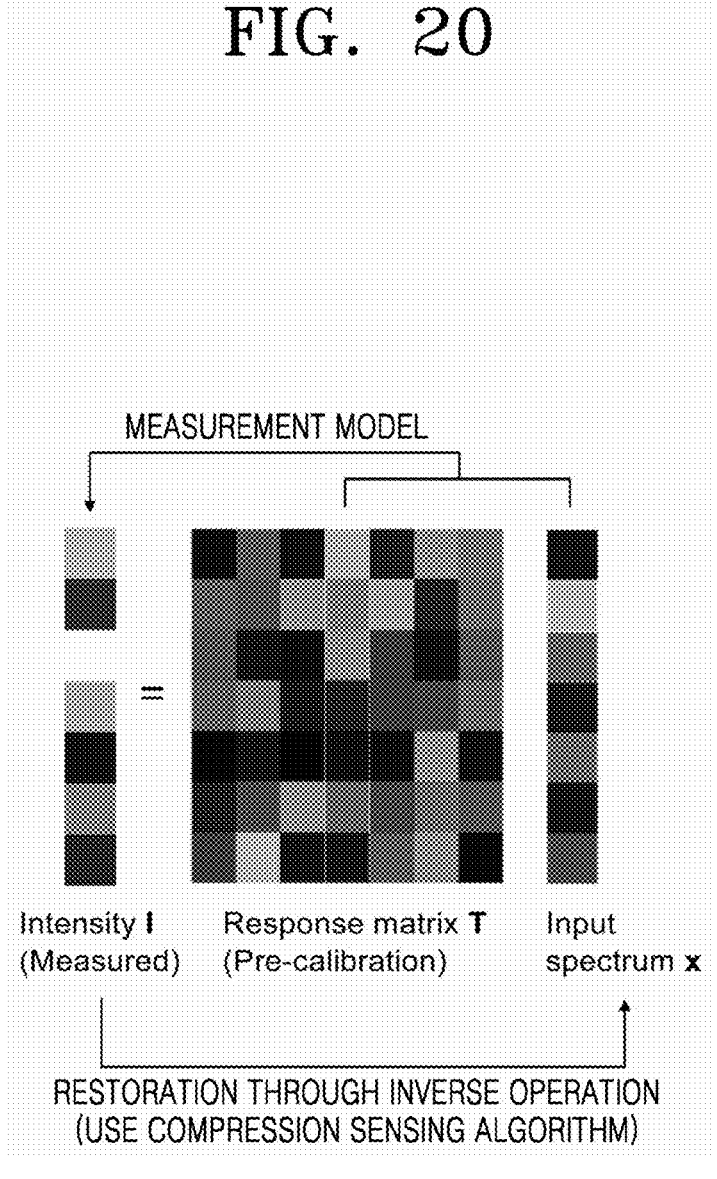
FIG. 20 is a diagram illustrating a principle of reconstructing spectrum information in the ultrasensitive spectrometer according to an embodiment.
Figure 21:
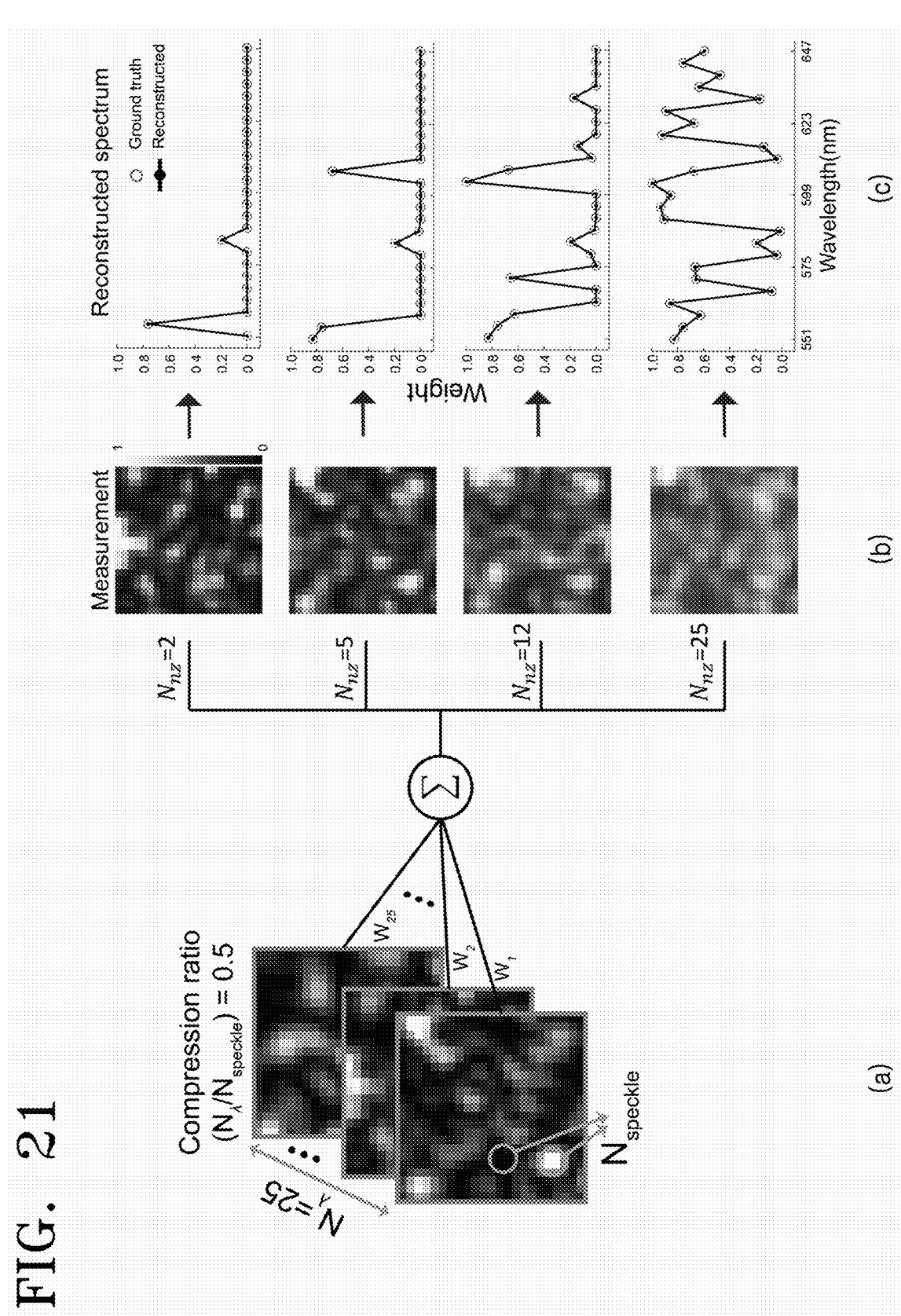
FIG. 21 is a diagram illustrating an embodiment of restoring spectrum information from overlapped speckle patterns by applying a compressive sensing algorithm.

FIG. 20 shows a principle of restoring spectrum information in the ultrasensitive spectrometer 10 according to an embodiment. In the ultrasensitive spectrometer 10 according to the embodiment, the signal processing unit 50 may restore spectrum information of analyzing light 1 by applying a compressive sensing algorithm from sensing information of an overlapped speckle pattern obtained from the light-receiving sensor 11. In FIG. 20, I refers to sensing information obtained by the light-receiving sensor 11, T refers to a compressive sensing response matrix, and x refers to spectrum information reconstructed by the signal processing unit 50 that corresponds to the spectrum of analyzing light 1 input to the ultrasensitive spectrometer 10. As in a measurement model exemplarily illustrated in FIG. 20, the spectrum information of analyzing light 1 may be restored through performing an inverse operation process that sensing information of an overlapped speckle pattern represents as a matrix operation of a compressive sensing response matrix obtained by using previously predicted speckle pattern information stored in the storage unit and an input spectrum. The compressive sensing response matrix T may be previously calibrated (pre-calibration) to increase the accuracy of spectrum restoration. FIG. 20 only shows an example of a measurement model, and embodiments are not limited thereto. In the same manner as in FIG. 20, spectrum analysis may be performed on a analyzing light 1 having various pieces of spectrum information FIG. 21 shows an embodiment of restoring spectrum information from overlapped speckle patterns by applying a compressive sensing algorithm. FIG. 21 is an example in which the ultrasensitive spectrometer 10 according to an embodiment is set to configure 25 independent color channels in a wavelength range of about 551 nm to about 651 nm and shows an example of restoring spectral information with a mixture of 2 to 25 wavelengths under a condition of sensing approximately 50 speckles ($N_{speckle} \approx 50$). The wavelength range, number $N_\lambda$ of restoring color channels, number $N_{speckle}$ of sensing speckles, a compression ratio $R_c$, and the like that are shown in FIG. 21 are shown merely examples for illustrating a process of restoring spectrum information from overlapped speckle patterns by applying the ultrasensitive spectrometer 10 according to an embodiment, and the embodiment is not limited thereto, and various other examples may be possible.

Referring to FIG. 21, the compression ratio of overlapped speckle patterns may correspond to the ratio of the number $N_\lambda$ of restoring color channels to the number $N_{speckle}$ of sensing speckles, that is, $N_\lambda/N_{speckle}$. Compressed speckle pattern may correspond to an overlap ($\Sigma$) of speckle pattern images ($W_1, \ldots$) for each spectrum corresponding to color channels to be restored.

For example, as exemplarily illustrated in FIG. 21, when $N_{speckle} \approx 50$ and the number $N_\lambda$ of restoring color channels is 25, the compression ratio may be 0.5, that is, $N_\lambda/N_{speckle} = 0.5$.

Here, $N_{speckle}$ is determined by the ratio of the pixel area of the light-receiving sensor 11 that senses speckle patterns/ an average speckle size. For example, when the light-receiving sensor 11 senses a speckle pattern in a 25×25 pixel area and the average speckle sensed is about a 3 to 4×3 to 4 pixel size, $N_{speckle}$ is about 50. In another example, when the light-receiving sensor 11 senses a speckle pattern in a 100×100 pixel area and the average speckle size sensed is about a 5×5 pixel size, $N_{speckle}$ is about 20×20=400.

When $N_\lambda = 25$, it may be considered that 25 spectrum-based speckle pattern images are overlapped. The number NA of restoring color channels may be determined by $\Delta\lambda$ for a spectral target wavelength range. For example, when the spectral target wavelength range is from 500 nm to 600 nm, the spectrum width is 100 nm, and $\Delta\lambda = 10$ nm, the wavelengths of color channels from which spectrum information is to be restored may be, for example, 500 nm, 510 nm, . . . , 590 nm. Therefore, the number of channels may be 10, that is, (spectral width/$\Delta\lambda = 100$ nm/10 nm=10).

A speckle pattern received by the light-receiving sensor 11 may be considered as, for example, an overlap of $N_\lambda$ spectrum-based speckle pattern images. In FIG. 21, (a) shows an overlap of $N_\lambda$ (=25) spectrum-based speckle pattern images ($W_1, \ldots, W_{25}$). In FIG. 21, (b) shows wavelength-mixed speckle patterns. $N_{nz}$ refers to the number of wavelengths, and in FIG. 21, (c) shows graphs each illustrating matching between a reconstructed spectrum and an actually measured (ground-truth) spectrum.

Referring to (a) and (c) in FIG. 21, when the number $N_\lambda$ of restoring color channels is 25 ($N_\lambda = 25$) in the spectral target wavelength range of about 551 nm to about 651 nm, spectrum information may be restored at intervals of $\Delta\lambda = 4$ nm.

In (b) of FIG. 21, a speckle pattern of $N_{nz} = 2$ indicates an overlap of speckle patterns of two wavelengths, a speckle pattern of $N_{nz} = 5$ indicates an overlap of speckle patterns of five wavelengths, a speckle pattern of $N_{nz} = 12$ indicates an overlap of speckle patterns of twelve wavelengths, and a speckle pattern of $N_{nz} = 25$ indicates an overlap of speckle patterns of twenty five wavelengths.

In (c) of FIG. 21, referring to a graph of a ground-truth spectrum and a reconstructed spectrum for the speckle pattern of two wavelengths ($N_{nz} = 2$), it could be confirmed that there are values (expressed as weights) at two wavelength positions. Referring to a graph of a ground-truth spectrum and a reconstructed spectrum for the speckle pattern of $N_{nz} = 5$, it could be confirmed that there are values at five or less wavelength positions including the two wavelength positions for the speckle pattern of $N_{nz} = 2$. Referring to a graph of a ground-truth spectrum and a reconstructed spectrum for the speckle pattern of $N_{nz} = 12$, it could be confirmed that there are values at twelve or less wavelength positions including the wavelength positions where values for the speckle pattern of $N_{nz} = 5$ exist. Referring to a graph of a ground-truth spectrum and a reconstructed spectrum for the speckle pattern of $N_{nz} = 25$, it could be confirmed that there are values at twenty five or less wavelength positions including the wavelength positions where values for the speckle pattern of $N_{nz} = 12$ exist.

FIG. 21 exemplarily shows that the ultrasensitive spectrometer 10 may be implemented to have 2, 5, 12, or 25 independent color channels. However, embodiments are not limited thereto. The ultrasensitive spectrometer 10 may be implemented to have various desired numbers of independent color channels according to settings. In addition, FIG. 21 shows an example of restoring spectrum information in with a mixture of two to twenty five wavelengths under the condition of sensing approximately 50 speckles ($N_{speckle} \approx 50$), and from this, it could be confirmed that more color information may be restored even when a number of sensed speckles is small, that is, even when a number of pixels of the light-receiving sensor 11 is small. That is, in the ultrasensitive spectrometer 10 according to an embodiment, spectral information may be restored from an overlapped speckle pattern by applying a compressive sensing algo-rithm, and thus number of restoring colors may be greater than number of measured pixels (number of sensed speck-les).

Figure 22A:
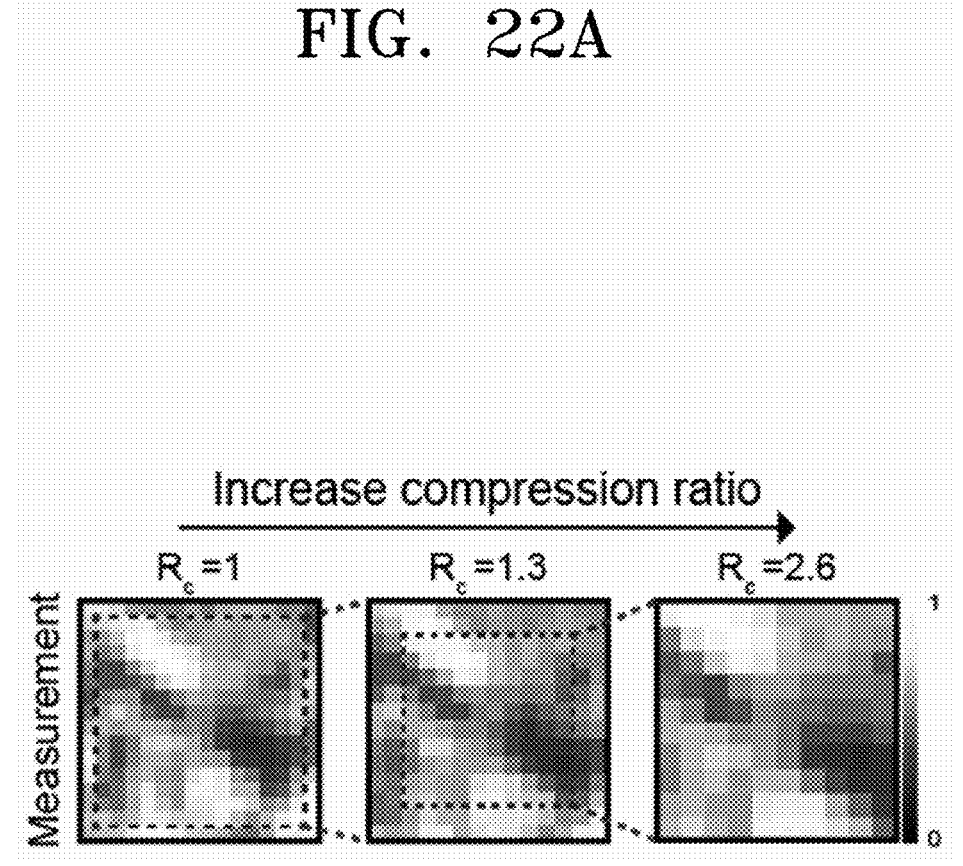
FIGS. 22A, 22B, and 22C are diagrams illustrating spectral restoration performance based on overlapped speckle patterns.
Figure 22B:
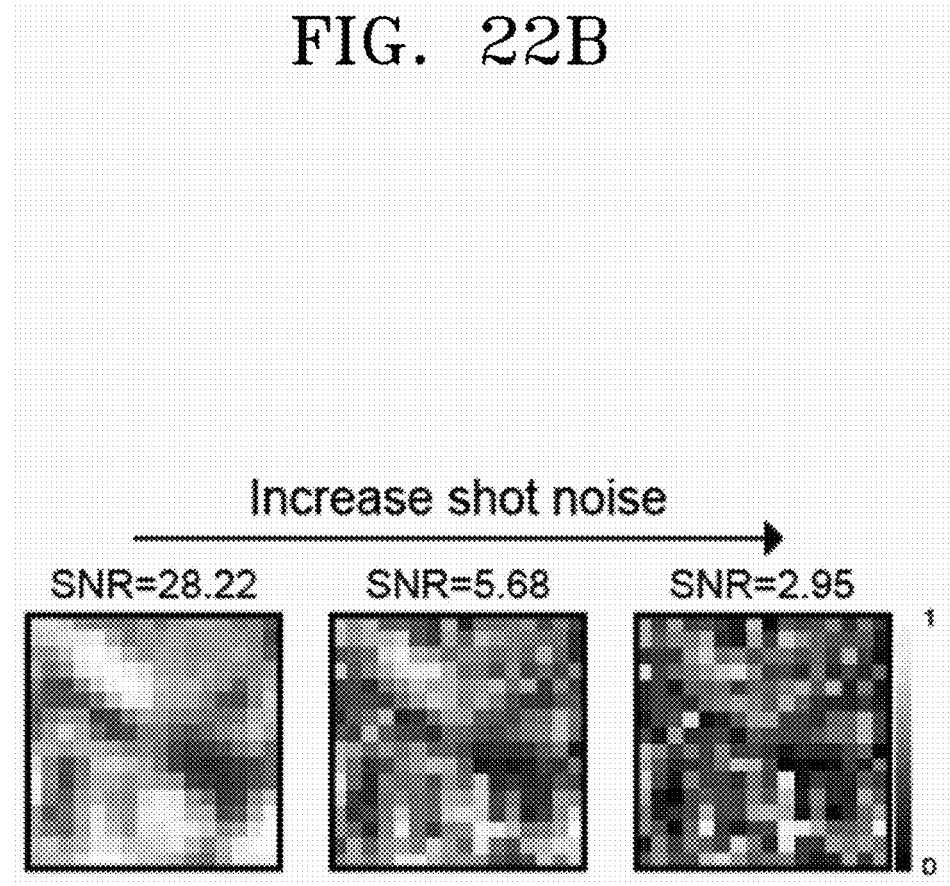
Figure 22C:
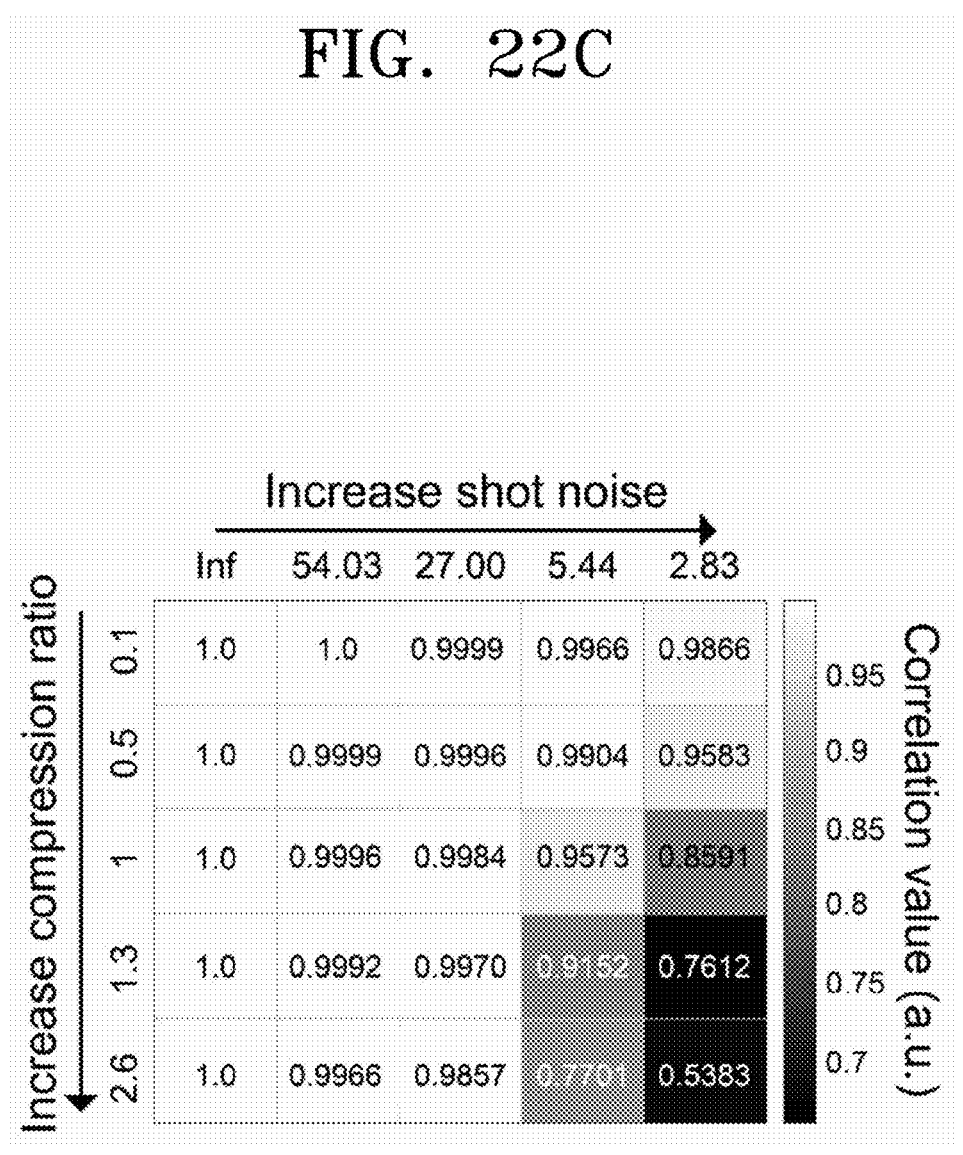

FIGS. 22A, 22B, and 22C are diagrams illustrating spec-tral restoration performance based on overlapped speckle patterns. FIG. 22A shows variation in speckle patterns measured while increasing a compression ratio $R_c$ to 1, 1.3, and 2. 6 ($R_c$=1, $R_c$=1.3, and $R_c$=2.6). FIG. 22B shows variation in speckle patterns when a signal-to-noise ratio (SNR) reduces (SNR=28.22, SNR=5.68, and SNR=2.95) as shot noise increases. The smaller the signal, the larger the shot noise ratio, so the SNR decreases. FIG. 22C is a table illustrating a relationship between shot noise and compres-sion ratio and restoration accuracy. In FIG. 22C, inf, 54.03, 27.00, 5.44, and 2.83 at the top of the table indicates SNR, 'inf' means infinity, and 0.1, 0.5, 1, 1.3, and 2.6 on the left side of the table indicates compression ratio $R_c$. As shown in FIG. 22C, the restoration accuracy may be maintained up to a situation where the SNR is as low as less than 3, and the compression ratio is 2 or more.

The ultrasensitive spectrometer 10 according to an embodiment as described above may be used in various optical devices, sensors, electronic devices including such sensors, and the like. For example, the ultrasensitive spec-trometer 10 be applied to sensors such as a gas sensor, a chemical sensor, a skin sensor, and a food sensor. The sensors may detect the concentrations and kinds of various molecules present in the air by using the ultrasensitive spectrometer 10, and at this time, the fact that wavelength transmittance varies depending on the kinds and concentra-tions of components may be utilized. In addition, the ultra-sensitive spectrometer 10 may be utilized as a device for inspecting objects. For example, the ultrasensitive spectrom-eter 10 may be utilized as a device for analyzing the position and shape of an object or analyzing, using Raman spectros-copy, the composition and physical properties of an object, the freshness of food, etc.

Examples of electronic devices in which the ultrasensitive spectrometer 10 according to an embodiment may be used as a sensor may include smartphones, mobile phones, cellular phones, personal digital assistants (PDAs), laptop comput-ers, personal computers (PCs), various portable devices, home appliances, security cameras, medical cameras, auto-mobiles, Internet of Things (IoT) devices, and other mobile or non-mobile computing devices, but are not limited thereto.

In addition to the ultrasensitive spectrometer 10, the electronic devices may further include a processor such as an application processor (AP) configured to control the ultrasensitive spectrometer 10, and may control a plurality of hardware or software components by executing an oper-ating system or an application program through the proces-sor and may perform various data processing and calculation operations.

According to the ultrasensitive spectrometer 10 according to embodiments as described above, spectral information of light to be analyzed may be restored from sensing informa-tion of an overlapped speckle pattern.

According to the ultrasensitive spectrometer according to embodiments, a scattering medium is applied and thus requires a short light propagation distance, ultra-small form factors may be implemented.

In above, while design examples of the scattering medium 20 for restoring spectral information of analyzing light with a set spectral resolution have been described with reference to embodiments shown in the accompanying drawings, it will be understood by those of ordinary skill in the art that the embodiments are merely examples, and various modi-fications and other equivalent embodiments may be made therein. Therefore, the embodiments described herein should be considered in a descriptive sense only and not for purposes of limitation. The scope of the disclosure is defined not by the above description but by the following claims, and all differences within equivalent ranges of the scope of the disclosure should be considered as being included in the scope of the disclosure.

What is claimed is:

1. An ultrasensitive spectrometer comprising:
   a scattering medium configured to scatter incident ana-lyzing light to form a random speckle pattern that sensitively changes according to wavelength varia-tions;
   a light-receiving sensor disposed at a rear end of the scattering medium and configured to sense the speckle pattern formed by the scattering medium;
   a storage unit comprising a memory storing previously predicted speckle pattern information according to wavelengths with respect to the scattering medium; and
   a signal processing unit comprising a processor config-ured to process a sensing signal generated by the light-receiving sensor to restore spectrum information of the analyzing light from sensing information of the speckle pattern formed by the scattering medium,
   wherein at least one of a number of a plurality of metasurfaces of the scattering medium and a separation distance between the plurality of metasurfaces is deter-mined such that speckle sizes of at least some of speckles of the speckle pattern are greater than a pixel size of the light-receiving sensor, and
   wherein a degree of disorder of the plurality of metasur-faces is constrained such that an average speckle size of the speckle pattern is greater than the pixel size of the light-receiving sensor.

2. The ultrasensitive spectrometer of claim 1, wherein at least one condition among scattering characteristics of the scattering medium and a separation distance between the scattering medium and the light-receiving sensor is deter-mined such that a speckle size of at least some of speckles of the speckle pattern formed on a sensing surface of the light-receiving sensor are greater than the pixel size of the light-receiving sensor.

3. The ultrasensitive spectrometer of claim 2, wherein the at least one condition is determined such that an average speckle size of the speckle pattern is greater than the pixel size of the light-receiving sensor.

4. The ultrasensitive spectrometer of claim 1, wherein the signal processing unit is further configured to restore the spectrum information by applying a compressive sensing algorithm to the sensing information of the speckle pattern.

5. The ultrasensitive spectrometer of claim 4, wherein the signal processing unit is further configured to restore the spectrum information of the analyzing light through an inverse operation process that sensing information of an overlapped speckle pattern represents as a matrix operation of a compressive sensing response matrix obtained using the previously predicted speckle pattern information stored in the storage unit and an input spectrum.

6. The ultrasensitive spectrometer of claim 1, wherein the scattering medium comprises a transparent medium and nanoparticles disorderly dispersed in the transparent medium.

7. The ultrasensitive spectrometer of claim 6, wherein the nanoparticles comprise a plurality of nanoparticles having different sizes, and a size range of the nanoparticles is determined to obtain spectral characteristics in a set spectral range.

8. The ultrasensitive spectrometer of claim 6, wherein the transparent medium is transparent to visible light.

9. The ultrasensitive spectrometer of claim 6, wherein the transparent medium comprises polydimethylsiloxane (PDMS), and the nanoparticles comprise ZnO.

10. The ultrasensitive spectrometer of claim 6, wherein the scattering medium is single layered or is formed by stacking a plurality of scattering medium layers.

11. The ultrasensitive spectrometer of claim 6, wherein a thickness and a scattering coefficient of the scattering medium are limited to obtain a set spectral resolution.

12. The ultrasensitive spectrometer of claim 11, wherein the thickness and the scattering coefficient of the scattering medium are limited to obtain a spectral resolution of 0.1 nm or less.

13. The ultrasensitive spectrometer of claim 1, wherein the scattering medium comprises a stacked structure of the plurality of metasurfaces that are spaced apart from each other and each have an array of meta-atoms, and at least one of the plurality of metasurfaces is a random metasurface.

14. The ultrasensitive spectrometer of claim 13, wherein the random metasurface comprises meta-atoms arranged in a disordered size distribution.

15. The ultrasensitive spectrometer of claim 14, wherein the meta-atoms of the random metasurface are formed at an identical height and sizes of the meta-atoms are irregular.

16. The ultrasensitive spectrometer of claim 15, wherein the meta-atoms of the random metasurface are regularly positioned.

17. The ultrasensitive spectrometer of claim 14, wherein the meta-atoms of the random metasurface are regularly positioned and have irregular sizes.

18. The ultrasensitive spectrometer of claim 13, wherein the separation distance between the plurality of metasurfaces is limited to obtain a spectral resolution of 0.1 nm or less.

\*    \*    \*    \*    \*